United States Patent
Kim et al.

(10) Patent No.: US 9,699,732 B2
(45) Date of Patent: Jul. 4, 2017

(54) APPARATUS AND METHOD FOR CONTROLLING COMMUNICATION MODULE

(71) Applicant: Samsung Electronics Co., Ltd., Suwon-si, Gyeonggi-do (KR)

(72) Inventors: Tae-Yoon Kim, Seongnam-si (KR); Chae-Man Lim, Seoul (KR); Hyoung-Joo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 72 days.

(21) Appl. No.: 14/692,193

(22) Filed: Apr. 21, 2015

(65) Prior Publication Data
US 2015/0312857 A1   Oct. 29, 2015

(30) Foreign Application Priority Data

Apr. 29, 2014   (KR) .................. 10-2014-0051983
Aug. 12, 2014   (KR) .................. 10-2014-0104470

(51) Int. Cl.
*H04W 52/02*   (2009.01)
*H04W 76/04*   (2009.01)

(52) U.S. Cl.
CPC ..... *H04W 52/0222* (2013.01); *H04W 52/028* (2013.01); *H04W 76/048* (2013.01)

(58) Field of Classification Search
CPC ............. H04W 52/02; H04W 52/0222; H04W 52/028; H04W 76/04; H04W 76/048; H04W 88/06; G06F 9/46
See application file for complete search history.

(56) References Cited

U.S. PATENT DOCUMENTS

| | | | |
|---|---|---|---|
| 6,240,521 B1 * | 5/2001 | Barber .................. | G06F 1/3203 713/323 |
| 2007/0140199 A1 * | 6/2007 | Zhao .................. | H04W 52/0229 370/338 |
| 2008/0244227 A1 | 10/2008 | Gee et al. | |
| 2010/0064154 A1 | 3/2010 | King | |
| 2011/0191568 A1 * | 8/2011 | Yamamoto ............ | G06F 1/3203 712/30 |

(Continued)

FOREIGN PATENT DOCUMENTS

| | | |
|---|---|---|
| EP | 2 354 891 A1 | 8/2011 |
| KR | 10-2013-0128518 A | 11/2013 |

(Continued)

*Primary Examiner* — Tri H Phan
(74) *Attorney, Agent, or Firm* — Jefferson IP Law, LLP

(57) ABSTRACT

A method of controlling a communication module by an electronic device is provided. The method includes receiving, by a second processor, a specified signal from a first processor informing that the first processor enters an inactive state from an active state, by a second processor, and controlling, by the second processor, a Wireless Fidelity (WiFi) communication function in response to the specified signal. According to an operation state of the first processor, that is, an inactive state such as a sleep state or a power off state, or an active state, a subject which processes WiFi communication is changed. Accordingly, it is possible to efficiently and continuously monitor WiFi communication data and process the WiFi communication data on an accurate period.

23 Claims, 23 Drawing Sheets

(56) References Cited

U.S. PATENT DOCUMENTS

| | | | |
|---|---|---|---|
| 2012/0106512 A1* | 5/2012 | Banerjea | H04W 76/026 370/331 |
| 2012/0188928 A1 | 7/2012 | Wang et al. | |
| 2012/0258707 A1* | 10/2012 | Mathias | H04W 36/30 455/426.1 |
| 2013/0182625 A1 | 7/2013 | Kuehnel et al. | |
| 2013/0308512 A1 | 11/2013 | Jeong | |
| 2014/0094198 A1 | 4/2014 | Heo et al. | |
| 2014/0187287 A1* | 7/2014 | Medapalli | H04W 72/1215 455/553.1 |
| 2014/0189392 A1* | 7/2014 | Bodio | G06F 1/3203 713/320 |
| 2014/0233549 A1 | 8/2014 | Kim et al. | |
| 2016/0174280 A1* | 6/2016 | Singh | H04W 76/025 370/329 |
| 2016/0209907 A1* | 7/2016 | Han | G06F 1/3209 |
| 2016/0219000 A1* | 7/2016 | Park | H04L 51/046 |

FOREIGN PATENT DOCUMENTS

| | | |
|---|---|---|
| KR | 10-2013-0137412 A | 12/2013 |
| KR | 10-2014-0042534 A | 4/2014 |
| KR | 10-2014-0103587 A | 8/2014 |

\* cited by examiner

APPARATUS AND METHOD FOR CONTROLLING COMMUNICATION MODULE

CROSS-REFERENCE TO RELATED APPLICATION(S)

This application claims the benefit under 35 U.S.C. §119 (a) of a Korean patent application filed on Apr. 29, 2014 in the Korean Intellectual Property Office and assigned Serial number 10-2014-0051983, and of a Korean patent application filed on Aug. 12, 2014 in the Korean Intellectual Property Office and assigned Serial number 10-2014-0104470, the entire disclosure of each of which is hereby incorporated by reference.

TECHNICAL FIELD

The present disclosure relates to an electronic device having a communication function. More particularly, the present disclosure relates to an apparatus and a method for controlling a communication module.

BACKGROUND

In electronic devices such as existing smart phones, a module for short range communication (for example, Wireless Fidelity (WiFi) communication) may be controlled through a processor such as an Application Processor (AP). In the electronic device, the AP may be directly connected to function blocks such as a display module, an input module, and a sensor module as well as a short range communication module to control the connected function blocks and perform a calculation process for processing data.

Meanwhile, the electronic device may operate in a sleep mode to reduce power consumption while the electronic device is not used. In the sleep mode, the AP may block power supplied to various function blocks and may not perform functions related to the short range communication module.

The above information is presented as background information only to assist with an understanding of the present disclosure. No determination has been made, and no assertion is made, as to whether any of the above might be applicable as prior art with regard to the present disclosure.

SUMMARY

Accordingly, when an electronic device desires to transmit/receive data using short range communication (for example, Wireless Fidelity (WiFi) communication or Bluetooth communication), the electronic device may not immediately process short range communication data even though the short range communication data is received if the electronic device is in the sleep mode. Further, an application processor (AP) should operate in an active mode such as a power on state to perform a function of processing short range communication data received from the outside. For example, the AP should be activated to perform communication using a WiFi communication function. For example, the AP may switch to an active mode for a periodic signal search through short range communication in a sleep mode.

Aspects of the present disclosure are to address at least the above-mentioned problems and/or disadvantages and to provide at least the advantages described below. Accordingly, an aspect of the present disclosure is to provide an electronic device and a method for controlling a short range communication function.

Another aspect of the present disclosure is to provide an electronic device and a method of controlling a short range communication function even while the electronic device is in a sleep state or the AP is in an inactive state.

In accordance with an aspect of the present disclosure, an electronic device is provided. The electronic device includes a WiFi module configured to perform WiFi communication, a first processor configured to control the WiFi module, and a second processor configured to receive a specified signal from the first processor and to control the WiFi module in response to the specified signal.

In accordance with another aspect of the present disclosure, a method of controlling a communication module by an electronic device is provided. The method includes receiving, by a second processor, a specified signal from a first processor informing that the first process enters an inactive state from an active state, and controlling, by the second processor, a WiFi communication function in response to the specified signal.

In accordance with another aspect of the present disclosure, a method is provided. The method includes activating, by an electronic device, a processor for controlling a cellular communication module and at least temporarily controlling a WiFi module through the activated processor.

In accordance with another aspect of the present disclosure, an electronic device is provided. The electronic device includes a first communication module, a second communication module, a first processor functionally connected to the first communication module, and a second processor configured to control the second communication module, the second processor being functionally connected to the first communication module, wherein, when the first processor is in an inactive state, the second processor is configured to at least temporarily controls the first communication module.

According to various embodiments of the present disclosure, a short range communication function can be used in an inactive state such as a sleep state or a power off state of an AP as well as a sleep state of an electronic device.

According to various embodiments of the present disclosure, a short range communication module can be controlled between an AP and another processor which is not the AP.

According to various embodiments of the present disclosure, a communication processor (CP) which periodically wakes up for cellular network communication in a state where an AP is in an inactive state can control a WiFi communication function.

According to various embodiments of the present disclosure, a WiFi control right can be exchanged between an AP and a CP according to the state of the AP or an operation scenario.

According to various embodiments of the present disclosure, a CP can control a WiFi communication function in consideration of the tradeoff between power consumed due to operations of WiFi connectivity experience, WiFi data coverage, and WiFi control.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
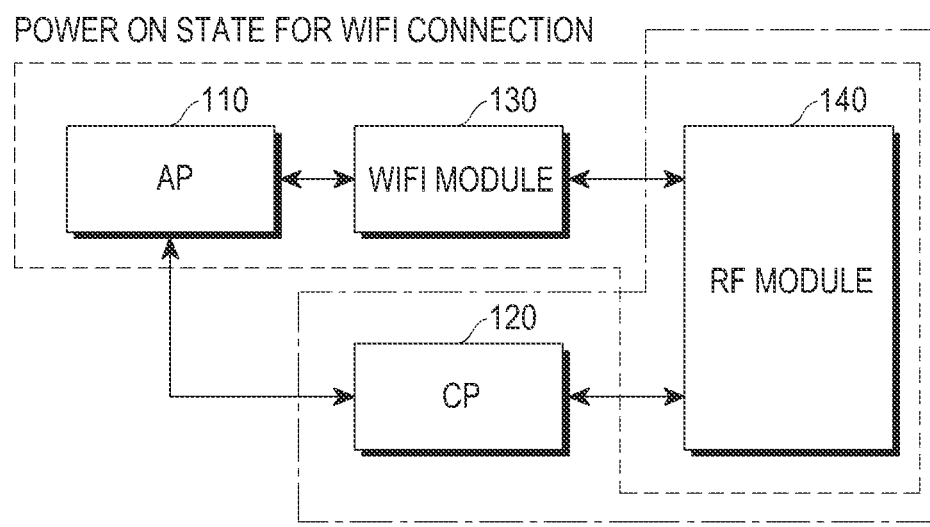
FIG. 1 is a block diagram illustrating a configuration for Wireless Fidelity (WiFi) communication data processing by a general electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in various embodiments of the present disclosure and does not limit one or more additional functions, operations, or components. Further, as used in various embodiments of the present disclosure, the terms "include", "have" and their conjugates may be construed to denote a certain characteristic, number, operation, constituent element, component or a combination thereof, but may not be construed to exclude the existence of or a possibility of addition of one or more other characteristics, numbers, operations, constituent elements, components or combinations thereof.

The term "or" used in various embodiments of the present disclosure includes any or all of combinations of listed words. For example, the expression "A or B" may include A, may include B, or may include both A and B.

The expression "1", "2", "first", or "second" used in various embodiments of the present disclosure may modify various components of various embodiments but does not limit the corresponding components. For example, the above expressions do not limit the sequence and/or importance of the corresponding elements. The expressions may be used to distinguish a component element from another component element. For example, a first user device and a second user device indicate different user devices although both of them are user devices. For example, without departing from the scope of the present disclosure, a first component element may be named a second component element. Similarly, the second component element also may be named the first component element.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

In the present disclosure, the terms are used to describe a specific embodiment, and are not intended to limit the present disclosure.

Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

Electronic devices according to various embodiments of the present disclosure may be devices adopting a communication function. For example, the electronic devices may include at least one of smart phones, tablet personal computers (PCs), mobile phones, video phones, e-book readers, desktop PCs, laptop PCs, netbook computers, personal digital assistants (PDAs), portable multimedia players (PMPs), digital audio players, mobile medical devices, cameras, wearable devices (e.g., head-mounted-devices (HMDs) such as electronic glasses), electronic clothes, electronic bracelets, electronic necklaces, electronic appcessories, electronic tattoos, or smart watches.

According to an embodiment of the present disclosure, an electronic device may be a smart home appliance with a communication function. The smart home appliances may include at least one of, for example, televisions (TVs), digital video disk (DVD) players, audio players, refrigerators, air conditioners, cleaners, ovens, microwaves, washing machines, air purifiers, set-top boxes, TV boxes (e.g., Home-Sync™ of Samsung, Apple TV™, or Google TV™), game consoles, electronic dictionaries, electronic keys, camcorders, or electronic frames.

According to various embodiments of the present disclosure, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

According to an embodiment of the present disclosure, the electronic devices may include at least one of furniture or a part of a building/structure having a communication function, electronic boards, electronic signature receiving devices, projectors, or various measuring equipment (e.g., equipment for a water supply, electricity, gases or radio waves). An electronic device according to various embodiments of the present disclosure may be a combination of one or more of above described various devices. Also, an electronic device according to various embodiments of the present disclosure may be a flexible device. Also, an electronic device according to various embodiments of the present disclosure is not limited to the above described devices.

Hereinafter, an electronic device according to various embodiments of the present disclosure will be described with reference to the accompanying drawings. In various embodiments of the present disclosure, the term "user" may indicate a person using an electronic device or a device (e.g. an artificial intelligence electronic device) using an electronic device.

According to various embodiments of the present disclosure, when an inactivation event is generated in the application processor (AP), the AP may inform a communication processor (CP) of an inactive state and then enter an inactive mode. Before the AP enters an active state, the CP may control a short range communication function based on information for a connection through short range communication (for example, Wireless Fidelity (WiFi), Zigbee, or Bluetooth (BT)).

According to an embodiment of the present disclosure, when a short range communication module (for example, a WiFi module) control right release event is generated in the AP, the AP may inform the CP of a short range communication module control right release event generation state and then enter an inactive mode. Before the short range communication module control right release event is generated again in the AP, the CP may control a short range communication function based on information for a short range communication connection. According to an embodiment of the present disclosure, when a WiFi control right release event is generated in the AP, the CP may control a WiFi communication function based on information for a WiFi connection. For example, the WiFi control right release event may be generated based on deactivation and activation of the AP, load or power consumption of the AP, and load or power consumption of the CP.

According to an embodiment of the present disclosure, the AP may transmit a deactivation notification signal according to the deactivation of the AP or a control right transmission notification signal to the CP. Alternatively, the AP may store information on a state of the AP in a memory, and the CP may identify the information stored in the memory and acquire information on a state of the AP.

According to various embodiments of the present disclosure, it is possible to continuously monitor WiFi communication since a processor for processing the WiFi communication can be changed according to variations in a sleep state of the AP, and a power off state of the AP as well as a sleep state of the electronic device.

According to various embodiments of the present disclosure, the AP and the CP may share various pieces of information such as a preferred access point, a public access point, information on a device which had been connected, profile information, or a designated access point for providing a particular service.

Prior to the description of various embodiments of the present disclosure, operations of the AP and the CP will be briefly described with reference to FIGS. 1 and 2.

Figure 2:
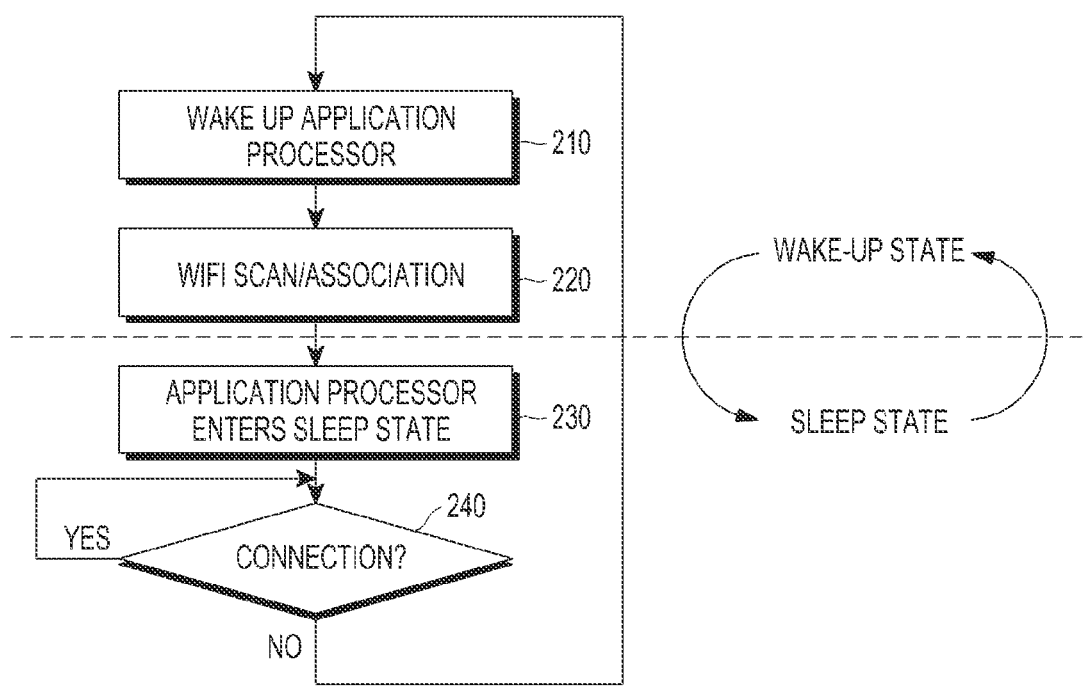
FIG. 2 is a flowchart illustrating a WiFi control using an application processor (AP) and an active operation and an inactive operation of the AP according to the WiFi control in a sleep state of an electronic device according to an embodiment of the present disclosure.

FIG. 1 is a block diagram illustrating a configuration in which a general electronic device processes WiFi communication data according to an embodiment of the present disclosure, and FIG. 2 is a flowchart illustrating a WiFi control using the AP in a sleep state of the electronic device and activation and deactivation of the AP according to the WiFi control, according to an embodiment of the present disclosure.

Referring to FIG. 1, an AP 110 may process WiFi communication data by controlling a WiFi module 130 in an active state. In contrast, a CP 120 may be periodically woken up for operations of a cellular standby mode to perform cellular communication through a Radio Frequency (RF) module 140.

Referring to FIG. 2, when the electronic device is in a sleep state, the AP 110 is also in the sleep state to reduce power consumption. When a WiFi function is turned on, the AP 110 may periodically wake up in operation 210 to search for an access point and may perform WiFi scan and association to access the found access point in operation 220. Thereafter, the AP 110 may operate in the sleep mode to reduce power consumption in operation 230. At this time, in order to reduce power consumption due to the waking up, when the AP 110 cannot find an access point based on a WiFi scan result and thus a WiFi connection is not made in operation 240, the AP 110 may perform a next sequenced scan operation after a predetermined time. As described above, when the AP 110 controls the WiFi module 130 to maintain the WiFi connection even in a state where the electronic device is in the sleep state, the AP 110 enters the sleep state after scan and connection commands. By increasing a waiting time between scan operations to a maximum waiting time until the access point is found through the repetition of a series of processes, power consumption of the electronic device can be reduced. However, even though the waiting time is increased, the AP 110 periodically wakes up even in a state where the electronic device is in the sleep state or the access point cannot be found, thereby consuming power according to a periodic signal search.

Various embodiments of the present disclosure may provide a method of continuously monitoring and processing WiFi communication data even though the AP enters an inactive state. To this end, the WiFi communication function may be controlled using an additional processor (for example, a microprocessor) operating using low energy or a processor (for example, a CP) periodically waking up for cellular communication.

Figure 3:
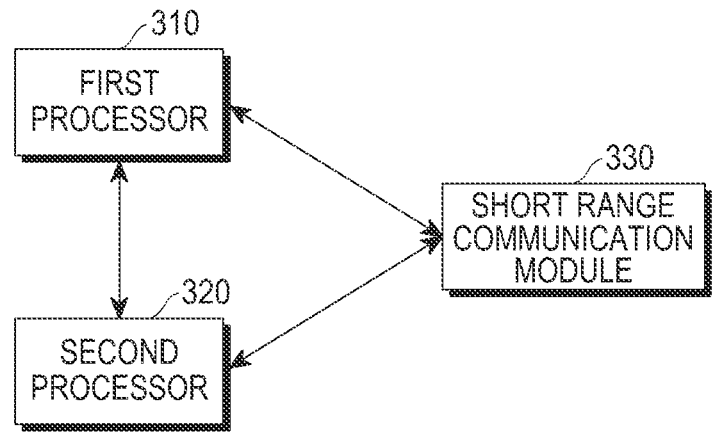
FIG. 3 is a block diagram illustrating a relationship among a first processor, a second processor, and a short range communication module for a WiFi communication control according to various embodiments of the present disclosure.

FIG. 3 is a block diagram illustrating a relationship among a first processor, a second processor, and a short range communication module for a WiFi communication control according to various embodiments of the present disclosure.

Referring to FIG. 3, according to various embodiments of the present disclosure, a short range communication module 330 for performing short range communication (for example, WiFi, Zigbee, BT, or Near Field Communication (NFC)) may be connected to a first processor 310 and a second processor 320. The short range communication module 330 may operate under control of one of the first processor 310 and the second processor 320 which have a short range communication control right. For example, when the second processor 320 receives a predetermined signal from the first processor 310 which controls the short range communication module 330, the second processor 320 may control the short range communication module 330 in response to the predetermined signal. Accordingly, in a state where the second processor 320 has the right to control the short range communication module 330, the short range communication module 330 may operate under control of the second processor 320. According to an embodiment of the present disclosure, the short range communication module 330 may include a GPS module.

According to an embodiment of the present disclosure, in an active state, the processor having the right to control the short range communication module (for example, the first processor or the second processor) may control the short range communication module 330. Accordingly, when the first processor 310 is in the active state, the short range communication module 330 may transmit/receive short range communication data under a control of the first processor 310. In contrast, when the first processor 310 is in an inactive state, the short range communication module 330 may transmit/receive short range communication data under a control of the second processor 320. Further, when the first processor 310 in the sleep mode receives the short range communication module control right from the second processor 320, the first processor 310 may control the short range communication module 330 again.

As described above, through one active processor between the first processor 310 and the second processor 320, the short range communication module (for example, a WiFi module) may be at least temporarily controlled.

Figure 4:
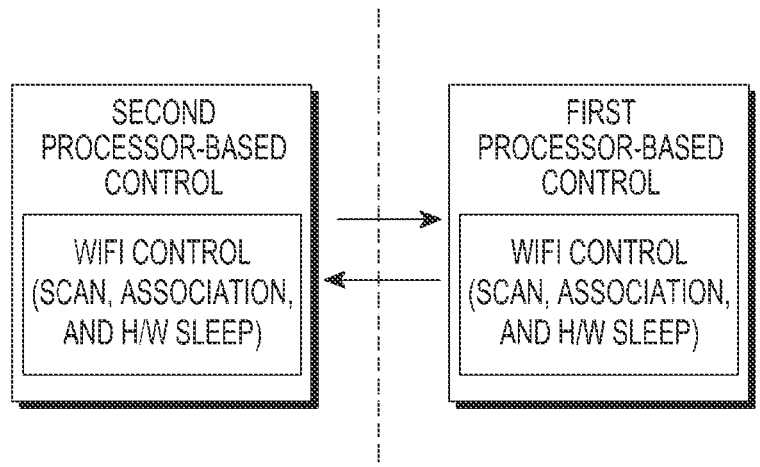
FIG. 4 illustrates a change in a WiFi control right between a first processor and a second processor according to various embodiments of the present disclosure.

FIG. 4 is a block diagram illustrating a WiFi control right change between a first processor (for example, the first processor 310) and a second processor (for example, the second processor 320) according to various embodiments of the present disclosure.

Referring to FIG. 4, according to an embodiment of the present disclosure, after a WiFi control right is handed over to the second processor from the first processor, WiFi control operations such as scan, association, and hardware sleep may be performed through a control of the second processor. In contrast, when the first processor has the WiFi control right, the WiFi control operations may be performed through a control of the first processor. As described above, according to various embodiments of the present disclosure, the first processor and the second processor may mutually transmit/receive the WiFi control right. For example, when the first processor enters an inactive state such as a power off state or a sleep state, the first processor may hand over the WiFi control right to the second processor. Information on conditions for the handover of the WiFi control right will be provided with reference to FIGS. 7 to 9.

Figure 5:
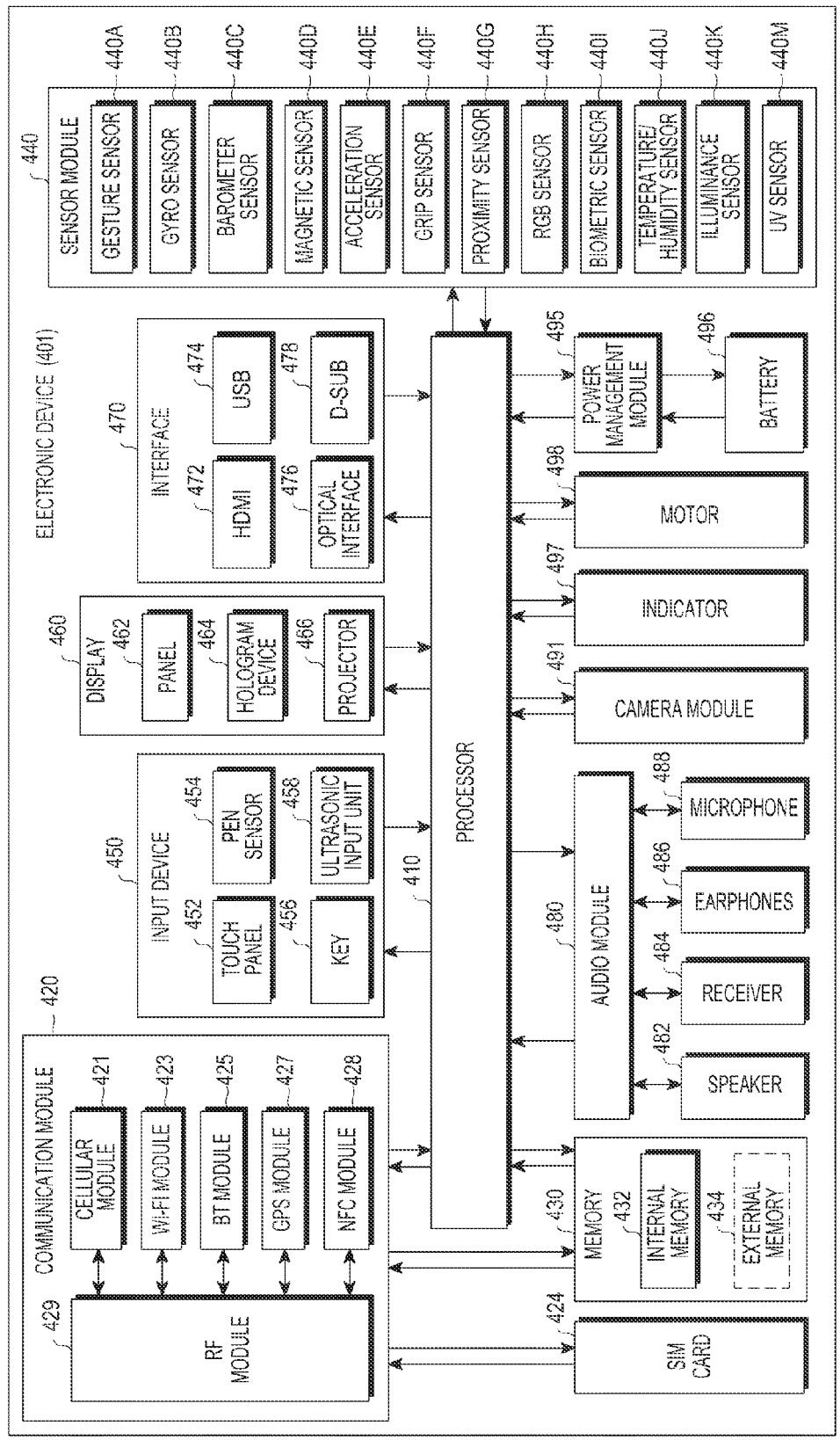
FIG. 5 is a block diagram of an electronic device according to various embodiments of the present disclosure.

FIG. 5 is a block diagram 400 of an electronic device 401 according to various embodiments of the present disclosure.

Referring to FIG. 5, the electronic device 401 may include at least one processor 410, a communication module 420, a Subscriber Identification Module (SIM) card 424, a memory 430, a sensor module 440, an input device 450, a display 460, an interface 470, an audio module 480, a camera module 491, a power management module 495, a battery 496, an indicator 497, and a motor 498.

The processor 410 may include one or more processors, for example, APs (for example, the first processor 310).

The processor 410 may control a plurality of hardware or software components connected to the processor 410 by driving an operating system or an application program, process various data including multimedia data, and perform calculations. The processor 410 may be implemented by, for example, a System on Chip (SoC). According to an embodiment of the present disclosure, the processor 410 may further include a Graphics Processing Unit (GPU) (not shown).

The communication module 420 (for example, the communication interface 160) may transmit/receive data in communication between the electronic device 401 and other electronic devices connected through a network. According to an embodiment of the present disclosure, the communication module 420 may include a cellular module 421, a WiFi module 423, a BT module 425, a GPS module 427, an NFC module 428, and an RF module 429.

The cellular module 421 may provide a voice, a call, a video call, a Short Message Service (SMS), or an Internet service through a communication network (for example, Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM) or the like). Furthermore, the cellular module 421 may distinguish and authenticate electronic devices within a communication network using a SIM (for example, the SIM card 424). According to an embodiment of the present disclosure, the cellular module 421 may perform at least some of the functions which can be provided by the processor 410. For example, the cellular module 421 may perform at least some of the multimedia control functions.

According to an embodiment of the present disclosure, the cellular module 421 may include a CP (for example, the second processor 320). Further, the cellular module 421 may be implemented by, for example, an SoC. Although the components such as the cellular module 421 (for example, the CP), the memory 430, and the power management module 495 are illustrated to be separate from the processor 410 in FIG. 5, the processor 410 may be implemented to include at least some of the above described components (for example, the cellular module 421) according to an embodiment of the present disclosure.

According to an embodiment of the present disclosure, the processor 410 or the cellular module 421 (for example, CP) may load a command or data received from at least one of a non-volatile memory and other components connected to each of the processor 410 and the cellular module 421 to a volatile memory and process the loaded command or data. Further, the processor 410 or the cellular module 421 may store data received from at least one of other components or created by at least one of other components in a non-volatile memory.

Each of the WiFi module 423, the BT module 425, the GPS module 427, and the NFC module 428 may include, for example, a processor for processing data transmitted/received through the corresponding module. Although the cellular module 421, the WiFi module 423, the BT module 425, the GPS module 427, and the NFC module 428 are illustrated as blocks separated from each other in FIG. 5, at least some (for example, two or more) of the cellular module 421, the WiFi module 423, the BT module 425, the GPS module 427, and the NFC module 428 may be included in one Integrated Chip (IC) or one IC package. For example, at least a few (for example, a CP corresponding to the cellular module 421 and a WiFi processor corresponding to the WiFi module 423) of processors corresponding to the cellular module 421, the WiFi module 423, the BT module 425, the GPS module 427, and the NFC module 428, respectively, may be implemented as a single SoC.

The RF module 429 may transmit/receive data, for example, an RF signal. Although not illustrated, the RF module 429 may include, for example, a transceiver, a Power Amp Module (PAM), a frequency filter, a Low Noise Amplifier (LNA), or the like. Further, the RF module 429 may further include a component, such as a conductor, a conductive wire or the like, for transmitting/receiving an electromagnetic wave in a free space in wireless communication. Although the cellular module 421, the WiFi module 423, the BT module 425, the GPS module 427, and the NFC module 428 are illustrated to share one RF module 429 in FIG. 5, at least one of the cellular module 429, the WiFi module 423, the BT module 425, the GPS module 427, and the NFC module 428 may transmit/receive the RF signal through a separate RF module.

The SIM card 424 may be a card including a SIM, and may be inserted into a slot formed in a particular portion of the electronic device. The SIM card 424 may include unique identification information (for example, an Integrated Circuit Card IDentifier (ICCID)) or subscriber information (for example, International Mobile Subscriber Identity (IMSI)).

The memory 430 may include an internal memory 432 or an external memory 434. The internal memory 432 may include at least one of a volatile memory (for example, a Dynamic Random Access Memory (DRAM), a Static RAM (SRAM), a Synchronous DRAM (SDRAM), and the like) and a non-volatile memory (for example, a One Time Programmable Read Only Memory (OTPROM), a PROM, an Erasable and Programmable ROM (EPROM), an Electrically Erasable and Programmable ROM (EEPROM), a mask ROM, a flash ROM, a Not And (NAND) flash memory, a Not Or (NOR) flash memory, and the like).

According to an embodiment of the present disclosure, the internal memory 432 may be a Solid State Drive (SSD). The external memory 434 may include, for example, a flash drive, for example, a Compact Flash (CF), a Secure Digital (SD), a Micro-SD, a Mini-SD, an extreme Digital (xD), a memory stick or the like. The external memory 434 may be functionally connected to the electronic device 401 through various interfaces. According to an embodiment of the present disclosure, the electronic device 401 may further include a storage device (or storage medium) such as a hard drive.

The sensor module 440 may measure a physical quantity or detect an operation state of the electronic device 401, and may convert the measured or detected information into an electronic signal. The sensor module 440 may include, for example, at least one of a gesture sensor 440A, a gyro sensor 440B, a barometer sensor 440C, a magnetic sensor 440D, an acceleration sensor 440E, a grip sensor 440F, a proximity sensor 440G, a color sensor 440H (for example, red, green, and blue (RGB) sensor), a biometric sensor 440I, a temperature/humidity sensor 440J, an illumination sensor 440K, and an Ultra Violet (UV) sensor 440M. Additionally or alternatively, the sensor module 440 may include, for example, an E-nose sensor (not illustrated), an ElectroMyo- Graphy (EMG) sensor (not illustrated), an ElectroEncephaloGram (EEG) sensor (not illustrated), an ElectroCardioGram (ECG) sensor (not illustrated), an InfraRed (IR) sensor, an iris sensor (not illustrated), a fingerprint sensor (not illustrated) and the like. The sensor module 440 may further include a control circuit for controlling one or more sensors included therein.

The input device 450 may include a touch panel 452, a (digital) pen sensor 454, a key 456, or an ultrasonic input device 458. The touch panel 452 may recognize a touch input through at least one of, for example, a capacitive type, a resistive type, an infrared type, and an ultrasonic type. The touch panel 452 may further include a control circuit. The capacitive type touch panel may recognize physical contact or proximity. The touch panel 452 may further include a tactile layer. In this case, the touch panel 452 may provide a tactile reaction to a user.

The (digital) pen sensor 454 may be implemented, for example, using a method identical or similar to a method of receiving a touch input of a user, or using a separate recognition sheet. The key 456 may include, for example, a physical button, an optical key or a keypad. The ultrasonic input device 458 is a device which can detect an acoustic wave by a microphone (for example, microphone 488) of the electronic device 401 through an input tool generating an ultrasonic signal to identify data and can perform wireless recognition. According to an embodiment of the present disclosure, the electronic device 401 may also receive a user input from an external device (for example, a computer or a server) connected thereto, using the communication module 420.

The display 460 (for example, the display 150) may include a panel 462, a hologram device 464, and a projector 466. The panel 462 may be, for example, a Liquid Crystal Display (LCD), Active-Matrix Organic Light Emitting Diode (AM-OLED), or the like. The panel 462 may be implemented to be, for example, flexible, transparent, or wearable. The panel 462 may be also configured as one module together with the touch panel 452. The hologram device 464 may show a stereoscopic image in the air using interference of light. The projector 466 may project light onto a screen to display an image. For example, the screen may be located inside or outside the electronic device 401. According to an embodiment of the present disclosure, the display 460 may further include a control circuit for controlling the panel 462, the hologram device 464, or the projector 466.

The interface 470 may include, for example, a High-Definition Multimedia Interface (HDMI) 472, a Universal Serial Bus (USB) 474, an optical interface 476, or a D-subminiature (D-sub) 478. Additionally or alternatively, the interface 470 may include, for example, a Mobile Highdefinition Link (MHL) interface, an SD card/Multi-Media Card (MMC) interface, or an Infrared Data Association (IrDA) standard interface.

The audio module 480 may bidirectionally convert a sound and an electronic signal. At least some of the components of the audio module 480 may be included in the input/output interface. The audio module 480 may process voice information input or output through, for example, a speaker 482, a receiver 484, earphones 486, the microphone 488 or the like.

The camera module 491 is a device which may photograph a still image and a video. According to an embodiment of the present disclosure, the camera module 491 may include one or more image sensors (for example, a front sensor or a rear sensor), a lens (not illustrated), an Image Signal Processor (ISP) (not illustrated) or a flash (not illustrated) (for example, an LED or xenon lamp).

The power management module 495 may manage power of the electronic device 401. Although not illustrated, the power management module 495 may include, for example, a Power Management IC (PMIC), a charger IC, or a battery or fuel gauge.

The PMIC may be mounted to, for example, an IC or an SoC semiconductor. Charging methods may be classified into a wired charging method and a wireless charging method. The charger IC may charge a battery and prevent over voltage or over current from being flowed from a charger. According to an embodiment of the present disclosure, the charger IC may include a charger IC for at least one of the wired charging method and the wireless charging method. A magnetic resonance scheme, a magnetic induction scheme, or an electromagnetic scheme may be exemplified as the wireless charging method, and an additional circuit for wireless charging, such as a coil loop circuit, a resonance circuit, a rectifier circuit, and the like may be added.

The battery gauge may measure, for example, the remaining amount of battery, a charging voltage and current, or temperature. The battery 496 may store or generate electricity, and may supply power to the electronic device 401 using the stored or generated electricity. The battery 496 may include, for example, a rechargeable battery or a solar battery.

The indicator 497 may display a particular status of the electronic device 401 or a part thereof (for example, the processor 410), for example, a booting status, a message status, a charging status, or the like. The motor 498 may convert an electrical signal into a mechanical vibration. Although not illustrated, the electronic device 401 may include a processing unit (for example, a GPU) for supporting mobile TV. The processing device for supporting mobile TV may process, for example, media data according to a standard of Digital Multimedia Broadcasting (DMB), Digital Video Broadcasting (DVB), media flow or the like.

The above described components of the electronic device according to various embodiments of the present disclosure may be formed of one or more components, and a name of a corresponding component element may be changed based on the type of electronic device. The electronic device according to the present disclosure may include one or more of the aforementioned components or may further include other additional components, or some of the aforementioned components may be omitted. Further, some of the components of the electronic device according to the various embodiments of the present disclosure may be combined to form a single entity, and thus, may equivalently execute functions of the corresponding elements prior to the combination.

Figure 6:
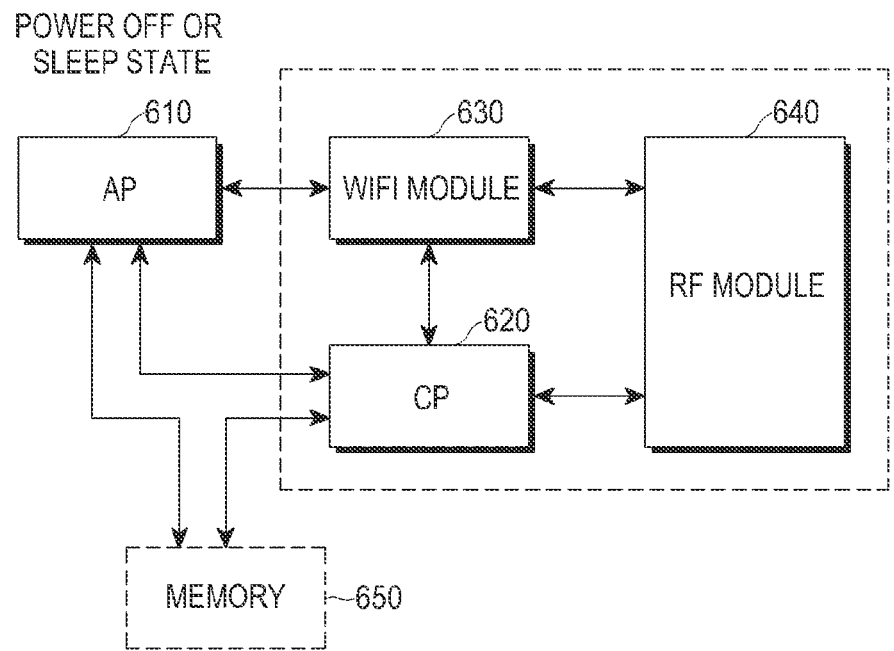
FIG. 6 is a block diagram of an electronic device when a second processor is a communication processor (CP) according to various embodiments of the present disclosure.

FIG. 6 is a block diagram of an electronic device when the second processor is a CP according to various embodiments of the present disclosure.

Referring to FIG. 6, when an AP 610 is in an inactive state such as a power off state or a sleep state, the AP 610 cannot control functional blocks connected to the AP 610, for example, functions of a WiFi module 630. In various embodiments of the present disclosure, the functions of the WiFi module 630 may be controlled by another processor, not the AP 610. In various embodiments of the present disclosure, a CP 620 will be described as an example of the processor. The CP 620 may periodically wake up for operations of a cellular standby mode to perform cellular communication through an RF module 640. The CP 620 may be activated to transmit/receive a predetermined cellular through the cellular communication module, that is, the RF module 640. Since the CP 620 repeatedly periodically wakes up and sleeps for the cellular communication through the RF module 640 regardless of an operation state of the electronic device and an inactive state of the AP 610, the CP 620 may control the WiFi module 630. The RF module 640 may transmit/receive data, for example, an RF signal under a control of the CP 620.

The AP 610 may control general operations of the electronic device and a signal flow between internal components, and may serve to process data. When a request for entering the inactive mode is made, the AP 610 may enter the inactive mode after informing the CP 620 of the request. The inactive mode may include one of a case where power of the AP 610 is turned off and a case where the AP 610 enters the sleep mode. The AP 610 may be functionally connected to the WiFi module 630. The CP 620 may be functionally connected to a cellular communication module, for example, the RF module 640 to control the RF module 640. When the AP 610 is in the inactive state, the CP 620 may be configured to at least temporarily control the WiFi module 630.

According to an embodiment of the present disclosure when the AP 610 is requested to enter the power off mode or the sleep mode, the AP 610 may transmit information required for a WiFi communication connection, that is, information related to the WiFi module 630, for example, information on at least one access point to the CP 620 and then may enter the power off mode or the sleep mode. Alternatively, the AP 610 may share information for the WiFi communication connection with the memory 650 before entering the power off mode or the sleep mode. The memory 650 may be a storage area which can be accessed by the AP 610 or the CP 620.

The memory 650 can be accessed by the CP 620 even when the AP 610 enters the inactive mode, so that the CP 620 may acquire the information for the WiFi communication connection from the memory 650. For example, the information for the WiFi communication connection may include information on pre-stored one or more access points. Further, the information on the WiFi communication connection may further include a WiFi communication stack and profile to use a WiFi communication scheme. Further, WiFi communication data processed by the CP 620 may be stored in the memory 650 to grasp a WiFi communication control state by the CP 620 when the AP 610 switches to the active mode. Accordingly, the AP 610 may refer to the memory 650 when switching to the active mode.

The WiFi module 630 may be implemented to be connected to the AP 610 or the CP 620 according to various embodiments of the present disclosure. The WiFi module 630 may be connected to the RF module 640 under a control of the CP 620 in order to make a connection with an external server or perform operations when the AP 610 is inactivated. Accordingly, the WiFi module 630 may transmit WiFi communication data to the AP 610 when the AP 610 is in the active mode. The WiFi module 630 may transmit WiFi communication data to the CP 620 when the AP 620 is in the inactive mode.

At this time, data required for WiFi communication may be loaded from the memory 650 (for example, RAM) connected to the CP 620, and the memory 650 may temporarily store data which is loaded from a memory within the AP 610. For example, information on a WiFi-related profile stored in a non-volatile memory of the AP 610 may be stored in the memory 650. Alternatively, the memory 650 may be included in the CP 620 or the WiFi module 630 in the non-volatile memory form.

Meanwhile, the CP 620 may be activated and operated at a timing period for data transmission/reception defined in the cellular network standard. Hereinafter, although an LTE network is described as an example of the cellular network in various embodiments of the present disclosure, the present disclosure can be equally applied to any cellular-based communication system such as Second Generation (2G), Third Generation (3G), or Fourth Generation (4G). Further, in various embodiments of the present disclosure, a Discontinuous Reception (DRX) period defined in the LTE standard is described as an example of the timing period for convenience of the description.

The CP 620 may execute a DRX mode. Accordingly, the CP 620 may switch the RF module 640 to the sleep state without continuously monitoring control channels and may be activated in a predetermined interval, that is, an activation interval according to the DRX period. As described above, the CP 620 may repeatedly and periodically perform wake up and sleep operations according to the execution of the DRX mode even when the electronic device or the AP 610 is in the inactive state. For example, the CP 620 may wake up from the sleep state at every predetermined time according to the DRX period. Accordingly, in various embodiments of the present disclosure, when the AP 610 enters the inactive mode, the CP 620 may control the WiFi module 630 to process WiFi communication data while the CP 620 is awake, for example, during the active interval. For example, for the WiFi communication control, waking up the AP 610 is not required thereby reducing power consumption generated when the AP 610 wakes up.

Meanwhile, in the following description, the "active mode" of the AP 610 according to various embodiments of the present disclosure may include a mode in which the electronic device operates. For example, power is supplied to functional blocks connected to the AP 610 and functions thereof may be performed. Accordingly, the AP 610 operating in the active mode may control the WiFi module 630 and the CP 620 may control the RF module 640.

The electronic device according to various embodiments of the present disclosure may include a WiFi module for performing WiFi communication, a first processor for controlling the WiFi module, and a second processor for receiving a specified signal from the first processor and controlling the WiFi module in response to the specified signal.

According to various embodiments of the present disclosure, when the first processor enters the inactive state from the active state, the first processor may be configured to transmit a specified signal to the second processor.

According to various embodiments of the present disclosure, the first processor and the second processor may be the AP and the CP, respectively.

According to various embodiments of the present disclosure, the second processor may be configured to control the WiFi module according to a communication period set to the second processor, and the set communication period may include a DRX period defined in the LTE standard.

According to various embodiments of the present disclosure, when the first processor enters the active state from the inactive state, the first processor may be configured to transmit a specified signal informing of the entrance to the active state to the second processor, and the second processor may be configured to release the control of the WiFi module in response to the signal informing of the entrance to the active state.

According to various embodiments of the present disclosure, when the first processor enters the inactive state, the first processor may be configured to transmit information related to the WiFi module to the second processor. The information related to the WiFi module may include information on one or more access points. The second processor may be configured to perform a scan or connection through the WiFi module based on the information.

According to various embodiments of the present disclosure, the inactive state may include one of the sleep state of the electronic device, the sleep state of the first processor, and the power off state of the first processor.

According to various embodiments of the present disclosure, when a Voice over LTE (VoLTE) call is connected through the second processor, the first processor may enter the inactive state, and the second processor may perform the scan through the WiFi module in response to the specified signal and may make a control to hand over the VoLTE call to a WiFi call based on a result of the scan.

According to various embodiments of the present disclosure, when quality of the WiFi connection through the WiFi module meets a specified quality condition, the second processor may be configured to hand over the VoLTE call to the WiFi call.

Further, the electronic device according to various embodiments of the present disclosure may include a first communication module and a second communication module; a first processor functionally connected to the first communication module; and a second processor for controlling the second communication module, the second processor being functionally connected to the first communication module. When the first processor is in the inactive state, the second processor may be configured to at least temporarily control the first communication module.

According to various embodiments of the present disclosure, when the second processor is activated to control the second communication module, the second processor may be configured to at least temporarily control the first communication module, the first communication module may include a short range communication module, and the second communication module may include a cellular communication module.

According to various embodiments of the present disclosure, when the first processor is activated, the first processor may be configured to at least temporarily control the first communication module. The entrance of the first processor to the inactive mode may be performed according to a predetermined sleep period or performed according to an input signal such as a power key by the user in a state where the first processor is activated. Further, the second processor may also operate in the active mode or the sleep mode like the first processor. The active mode of the second processor may refer to a state in which data is processed through the RF module, and the sleep mode may refer to a sleep state in which channel information is not collected according to a DRX period defined in the LTE standard.

Figure 7:
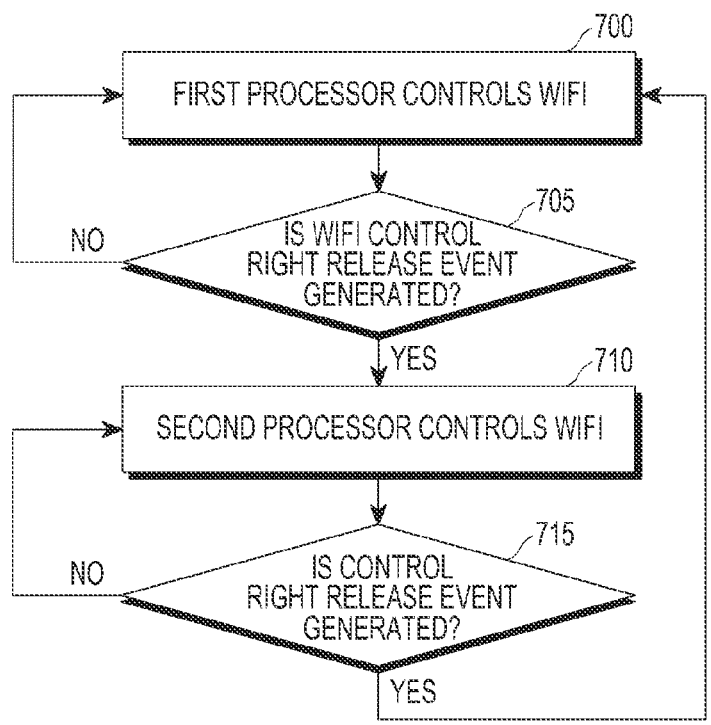
FIG. 7 is a flowchart illustrating a WiFi control right change process between a first processor and a second processor by a WiFi control right release event according to various embodiments of the present disclosure.

FIG. 7 is a flowchart illustrating a process of switching a WiFi control right between a first processor (for example, the AP 610) and a second processor (for example, the CP 620) by a WiFi control right release event according to various embodiments of the present disclosure.

Referring to FIG. 7, while the first processor controls WiFi in operation 700, it is determined whether a WiFi control right release even is generated in operation 705. For example, when the WiFi control right release event is generated, the WiFi control right may be handed over to the second processor from the first processor, and the second processor may control WiFi in operation 710. At this time, the first processor may be switched to the inactive state after handing over the WiFi control right.

In operation 715, it may be determined whether a WiFi control right release event is generated while the second processor controls WiFi. For example, when the WiFi control right release event is generated, the second processor may hand over the WiFi control right again to the first processor, and accordingly, the second processor may return to operation 700 to allow the above described process to be repeatedly performed. As described above, based on whether the WiFi control right release event is generated or not, the first processor and the second processor may exchange the WiFi control right to control a WiFi function.

Figure 8:
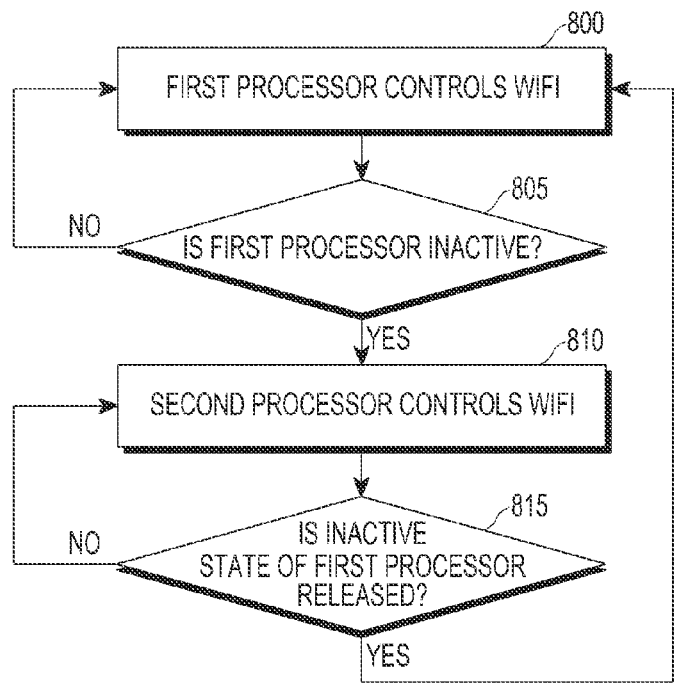
FIG. 8 illustrates a case where a WiFi control right release event is a sleep event in a first processor according to various embodiments of the present disclosure.

FIG. 8 is a flowchart illustrating a case where a WiFi control right release event is a sleep event of the first processor according to various embodiments of the present disclosure. In FIG. 8, a switching state between the active state and the inactive state of the first processor is described as an example of the WiFi control right release event.

Referring to FIG. 8, while the first processor controls WiFi in operation 800, it may be determined whether the first processor switches to the inactive state in operation 805. For example, when the first processor switches to the inactive state such as a power off state or a sleep state from the active state, it may be determined that the WiFi control right release event is generated.

At this time, the first processor may transmit a WiFi communication control command or an inactive state switching notification to the second processor before the first processor switches to the inactive state, or the second processor may control the WiFi communication simultaneously with no power supply to the first processor. Accordingly, when the first processor switches to the inactive state in operation 805, the second processor (for example, the CP or microprocessor) may control WiFi in operation 810, and may determine whether the inactive state of the first processor is released while controlling WiFi in operation 815.

When the inactive state of the first processor is released in operation 815, that is, when the first processor enters the active state, the process returns to operation 800 and the WiFi control operation may be performed by the first processor. To this end, when the inactive state of the first processor is released, the first processor may transmit a control end command to the second processor so that the second processor does not control the WiFi communication any more when the first processor is activated, or the second processor may automatically end the WiFi control according to a first processor activation condition and thus the first processor-based WiFi control may be started.

Figure 9:
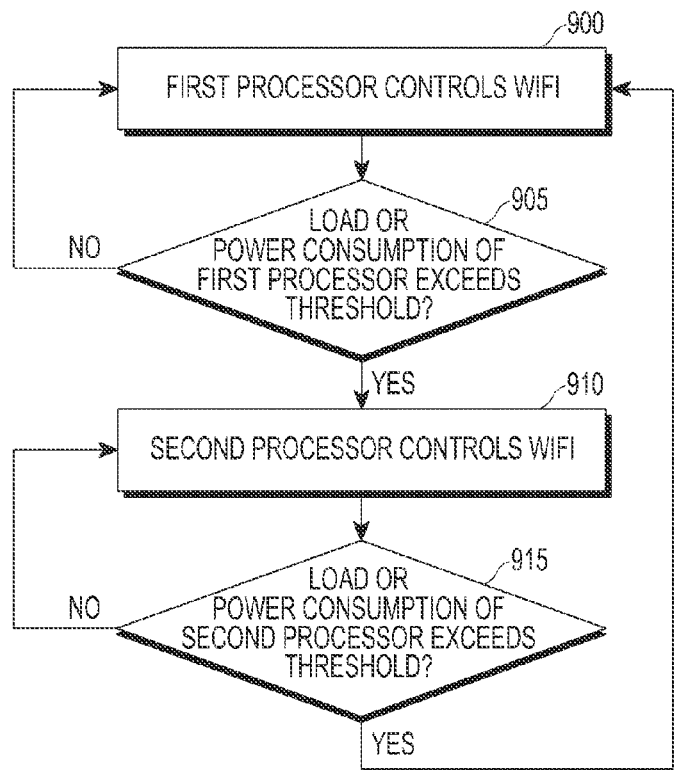
FIG. 9 illustrates a case where a WiFi control right release event is an event generated by load or power consumption of a first processor and a second processor according to various embodiments of the present disclosure.

FIG. 9 is a flowchart illustrating a case where a WiFi control right release event is an event generated by load or power consumption of the first processor (for example, the processor 410) and the second processor (for example, the CP or the microprocessor) according to various embodiments of the present disclosure.

Referring to FIG. 9, while the first processor controls WiFi in operation 900, it may be determined whether load or power consumption of the first processor exceeds a threshold in operation 905. When the load or power consumption of the first processor exceeds the threshold, the second processor may perform the WiFi control in operation 910. Further, while the second processor performs the WiFi control, it may be determined whether load or power consumption of the second processor exceeds a threshold in operation 915. When the load or power consumption exceeds the threshold, the process may return to operation 900.

Figure 10:
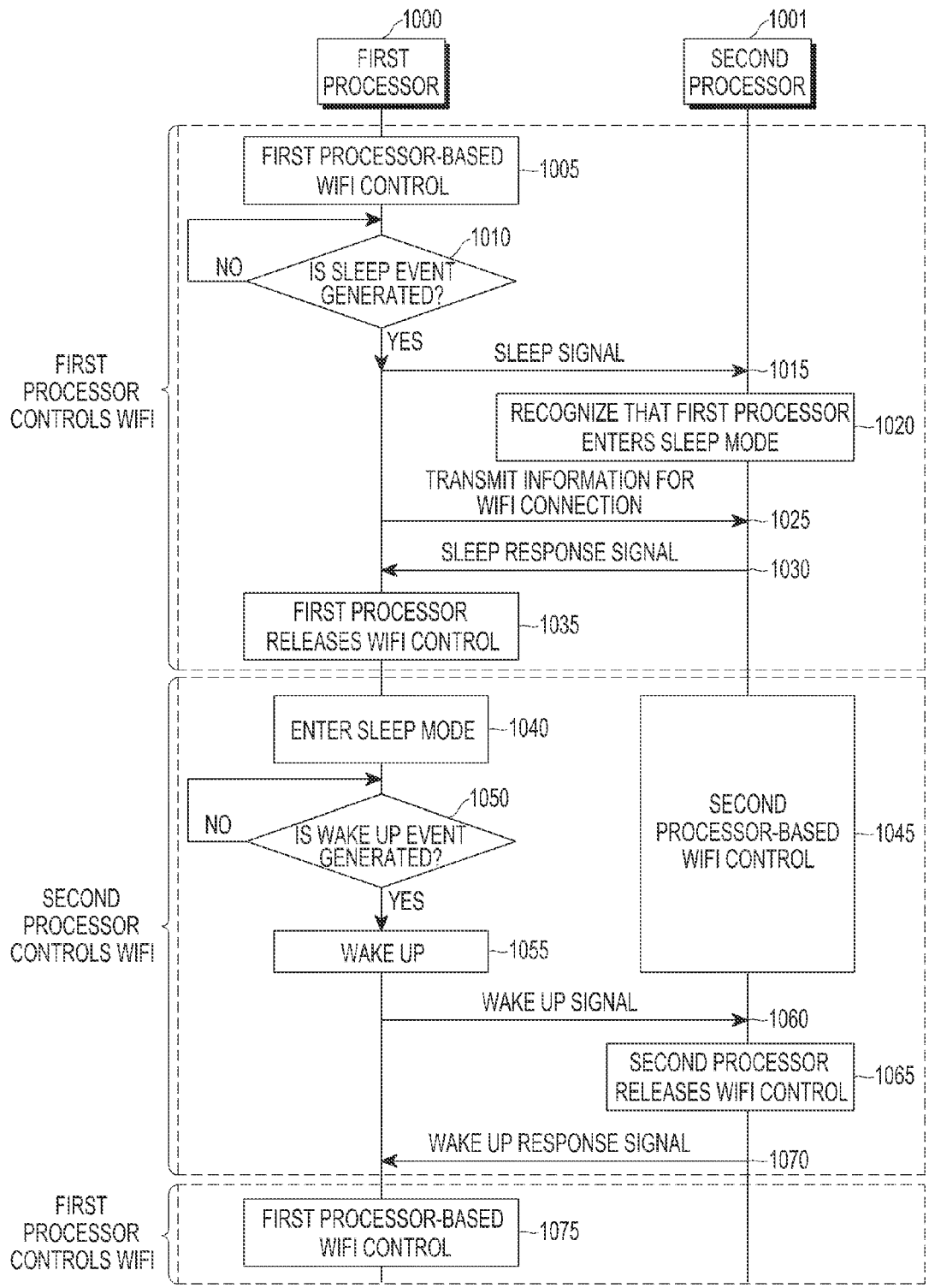
FIG. 10 is a flowchart illustrating a signal transmission/reception processor for a WiFi control between a first processor and a second processor by a WiFi control right release event according to various embodiments of the present disclosure.

FIG. 10 is a flowchart illustrating a signal transmission/reception processor for a WiFi control between a first processor and a second processor by a WiFi control right release event according to various embodiments of the present disclosure.

Referring to FIG. 10, in an active mode, a first processor 1000 (for example, the AP 610) may control a first processor 1000-based WiFi module in operation 1005. Subsequently, it may be determined whether a sleep event is generated in operation 1010. The sleep event may correspond to a case where a call is processed after a voice call is configured, a case where the electronic device enters the sleep mode without any user input for a predetermined time, a case where a display is turned off, or a case where a lock setting key is input. The sleep event may further correspond to a case where a function for an initial control such as a WiFi search is configured in a user menu setting to be performed by the second processor (for example, the CP 620).

When the sleep event is generated, the first processor 1000 may transmit a sleep signal informing the second processor 1001 of the entrance to the sleep mode in operation 1015, and the second processor 1001 may recognize that the first processor 1000 enters the sleep mode in response to the sleep signal in operation 1020. The sleep signal may be a signal informing of state switching such as a WiFi communication control command or a sleep state. In response to the sleep signal, the second processor 1001 may start preparation for the WiFi control. Although a case where the second processor 1001 starts the WiFi control in response to the sleep signal is illustrated in FIG. 10, the second processor 1001 may control the WiFi communication simultaneously with the entrance of the first processor 1000 to the sleep mode. For example, the second processor 1001 may periodically or aperiodically monitor a state of the first processor 1000 and control the WiFi communication based on a monitoring result.

Subsequently, the first processor 1000 may transmit information for the WiFi connection to the second processor 1001 in operation 1025. When the first processor 1000 receives a sleep response signal from the second processor 1001 in operation 1030, the first processor 1000 may release the WiFi control in operation 1035. As described above, before the first processor 1000 enters the sleep mode, the first processor 1000 may control the WiFi communication. For example, the information for the WiFi connection may include, for example, information on a preferred access point, public access point, access point designated to provide a particular service, position-based access point, or a particular access point for a continuous connection, but it is only an example and the present disclosure is not limited thereto.

For example, in order to continuously provide the WiFi connection for an access point pre-stored by the user in home, office or the like, the first processor 1000 may transmit pre-stored access information on a preferred access point or a public access point to the second processor 1001 before the first processor 1000 enters the inactive mode. Alternatively, the first processor 1000 may store the information in the memory.

Further, when the first processor 1000 transmits information on an access point designated for a particular service, the second processor 1001 has only to scan the designated access point, so that power consumption due to the scan can be minimized. Alternatively, when the first processor 1000 transmits information on an access point having a level higher than or equal to a predetermined signal level, the second processor 1001 may reduce power consumption due to the scan. To this end, the first processor 1000 may provide the second processor 1001 with information on an access point in a list form. For example, call quality should be guaranteed for handover from the VoLTE call to the WiFi call. Accordingly, when information on a particular access point connected to a corresponding service provider network is provided, the second processor 1001 may scan or access the corresponding access point.

According to an embodiment of the present disclosure, the second processor 1001 may provide a positioning service (for example, a WiFi positioning system) of the electronic device using a WiFi network. For example, the second processor 1001 may acquire information on a current position-based access point through the WiFi module. According to an embodiment of the present disclosure, the second processor 1001 may receive the information on the current position-based access point (for example, list of neighboring access points) or current position information (for example, longitude and latitude information) from the first processor 1000. For example, the second processor 1001 may acquire access point information corresponding to the current position information by searching a data base which stores access point lists based on the position information. For example, the first processor 1000 may also transmit information on the database to the second processor 1001.

Further, the first processor 1000 may transmit information on the particular access point for the continuous connection to the second processor 1001. For example, when the WiFi connection is not used for a predetermined time or longer to reduce power consumption, the electronic device may end the WiFi connection (for example, disassociation). According to an embodiment of the present disclosure, even though the WiFi connection is not used for a predetermined time or longer, a particular access point may be required to maintain the connection sometimes. In this case, the second processor 1001 may separately manage the particular access point information to limit the operation of the particular access point such as disassociation.

According to an embodiment of the present disclosure, information for the WiFi connection from the first processor 1000 to the second processor 1001 may include information on at least one of a preferred access point list, public access point list, access point designated to provide a particular service, position-based access point, and a particular access point for a continuous connection, or a combination thereof.

Meanwhile, when the first processor 1000 enters the sleep mode in operation 1040, the second processor 1001 may control the second processor-based WiFi module in operation 1045. That is, the second processor 1001 may control the WiFi connection. The first processor 1000 may determine whether a wake up event for the first processor 1000 is generated in the sleep mode in operation 1050. When the wake up event is generated, the first processor 1000 may wake up in operation 1055 and then transmit a wake up signal to the second processor 1001 in operation 1060. Before the wake up signal is transmitted from the first processor 1000, the second processor 1001 may perform the WiFi control in an interval (for example, a DRX transmission/reception interval) where the second processor 1001 is activated. When the wake up signal is transmitted, the second processor 1001 may release the WiFi control in operation 1065 and transmit a wake up response signal to the first processor 1000 in operation 1070. As described above, when the first processor 1000 wakes up, the second processor 1001-based WiFi control may end. Further, the first processor 1000 having received the wake up response signal may control the first processor 1000-based WiFi module while checking a current WiFi connection state in operation 1075.

Figure 11:
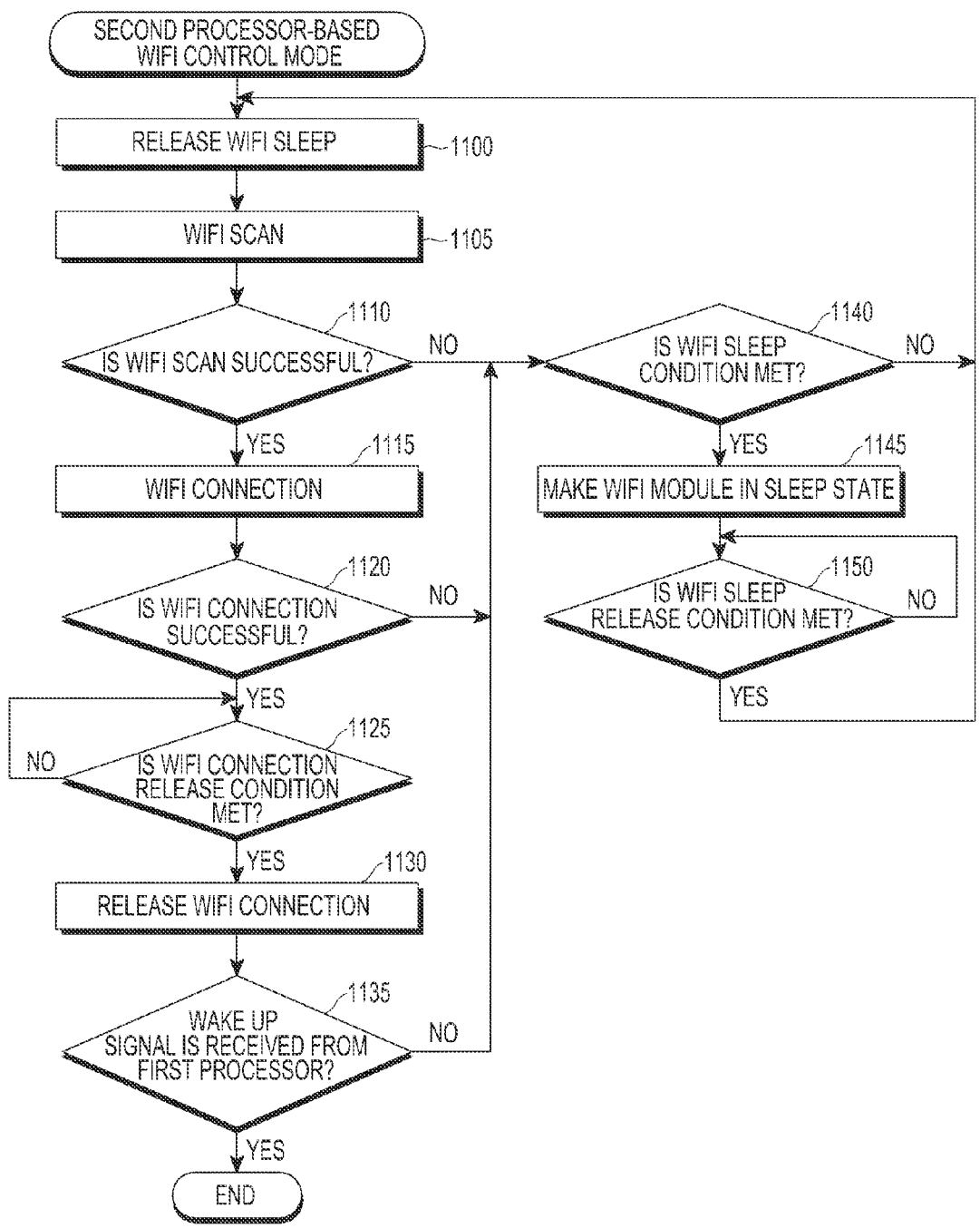
FIG. 11 is a flowchart illustrating an operation of a second processor according to various embodiments of the present disclosure.

FIG. 11 is a flowchart illustrating the operation of the second processor (for example, the CP 620) according to various embodiments of the present disclosure. FIG. 11 illustrates a process in which the second processor 1001 receives the WiFi control right from the first processor 1000 to control the WiFi communication after the first processor 1000 (for example, the AP 610) enters the sleep state. Although it is assumed that the first processor 1000 enters the sleep state in FIG. 11, the following process can be equally applied to a power off state or a sleep state of the electronic device.

Referring to FIG. 11, when the second processor 1001 releases the sleep mode of the WiFi module in operation 1100 and then completely wakes up the WiFi module, the second processor 1001 may instruct a WiFi scan operation in operation 1105. The second processor 1001 may determine whether the WiFi scan is successful in operation 1110. Specifically, when one or more access points are found, the second processor 1101 may consider that the WiFi scan is successful. At this time, the WiFi scan may be performed based on an access point list included in information for the WiFi connection provided from the first processor 1000.

In operation 1115, the second processor 1001 may attempt a connection to the found one or more access points by controlling the WiFi module. The second processor 1101 may determine whether the WiFi connection is successful in operation 1120. For example, when it is determined that the connection to one access point is successful through authentication and association with the access point, the second processor 1001 may consider that the WiFi connection is successful. At this time, when the number of found access points is plural, the second processor 1001 may compare the access point list provided from the first processor 1000 with a plurality of access points included in a scan result to select a desired access point, and may transmit information required for the authentication and association of the selected access point to the WiFi module to instruct a connection operation.

Subsequently, the second processor 1001 may determine whether a WiFi connection release condition is met in operation 1125. For example, when the WiFi connection release condition is not met, the second processor 1001 may transmit data through WiFi communication at the time when data transmission/reception is required. At this time, the processor for controlling the data transmission/reception through the WiFi communication may vary depending on a situation in which the data is transmitted such as a transmission amount of the data. For example, when the data transmission amount is equal or smaller than a predetermined transmission capacity, the data transmission may be performed by the second processor 1001. When the data transmission amount is larger than the predetermined transmission capacity, the second processor 1001 may wake up the first processor 1000 and then the data transmission may be performed under a control of the first processor 1000. Additional information therefor will be provided through the drawings described below. In contrast, when the WiFi connection release condition is met, the WiFi connection may be released in operation 1130. Subsequently, when the wake up signal is not received from the first processor 1000 in operation 1135, the processor cannot proceed to operation 1140.

Meanwhile, when the WiFi scan fails in operation 1110, the WiFi connection fails in operation 1120, or the wake up signal is not received from the first processor 1000 in operation 1135, the second processor 1001 may determine whether a WiFi sleep condition is met in operation 1140. For example, when the WiFi sleep condition is met, the second processor 1001 may switch the WiFi module to the sleep mode in operation 1145. For example, the WiFi sleep condition may include a case where no access point is found based on a scan result or a case where the access to the found access point fails.

According to an embodiment of the present disclosure, when no access point is found based on the scan result, the second processor 1001 may switch the WiFi module to the sleep mode in operation 1145. Alternatively, the second processor 1001 may turn off the WiFi module.

Subsequently, the second processor 1101 may determine whether a WiFi sleep release condition is met in operation 1150. When the WiFi sleep release condition is not met, the second processor 1101 may determine whether the WiFi sleep release condition is met again. For example, the WiFi sleep release condition may include at least one of a case where there is data to be transmitted through WiFi communication and a case where the sleep mode should be released by mobility of the electronic device, position information, or a timer. For example, when the WiFi sleep release condition is met, the second processor 1001 may return to operation 1100 and make a control to repeatedly perform the aforementioned process such as the release of the sleep mode of the WiFi module.

According to an embodiment of the present disclosure, even when the WiFi sleep condition is not met, the second processor 1001 may return to operation 1100 and make a control to repeatedly perform the aforementioned process. At this time, the second processor 1001 may instruct the WiFi module to perform a series of operations such as the scan, authentication, and association of a particular access point at the same time.

As described above, the second processor 1001 wakes up at every DRX period and checks the WiFi connection state. In a state where the WiFi connection is maintained, when there is data to be transmitted, the first processor 1000 or the second processor 1001 may transmit the data through WiFi communication.

Figure 12:
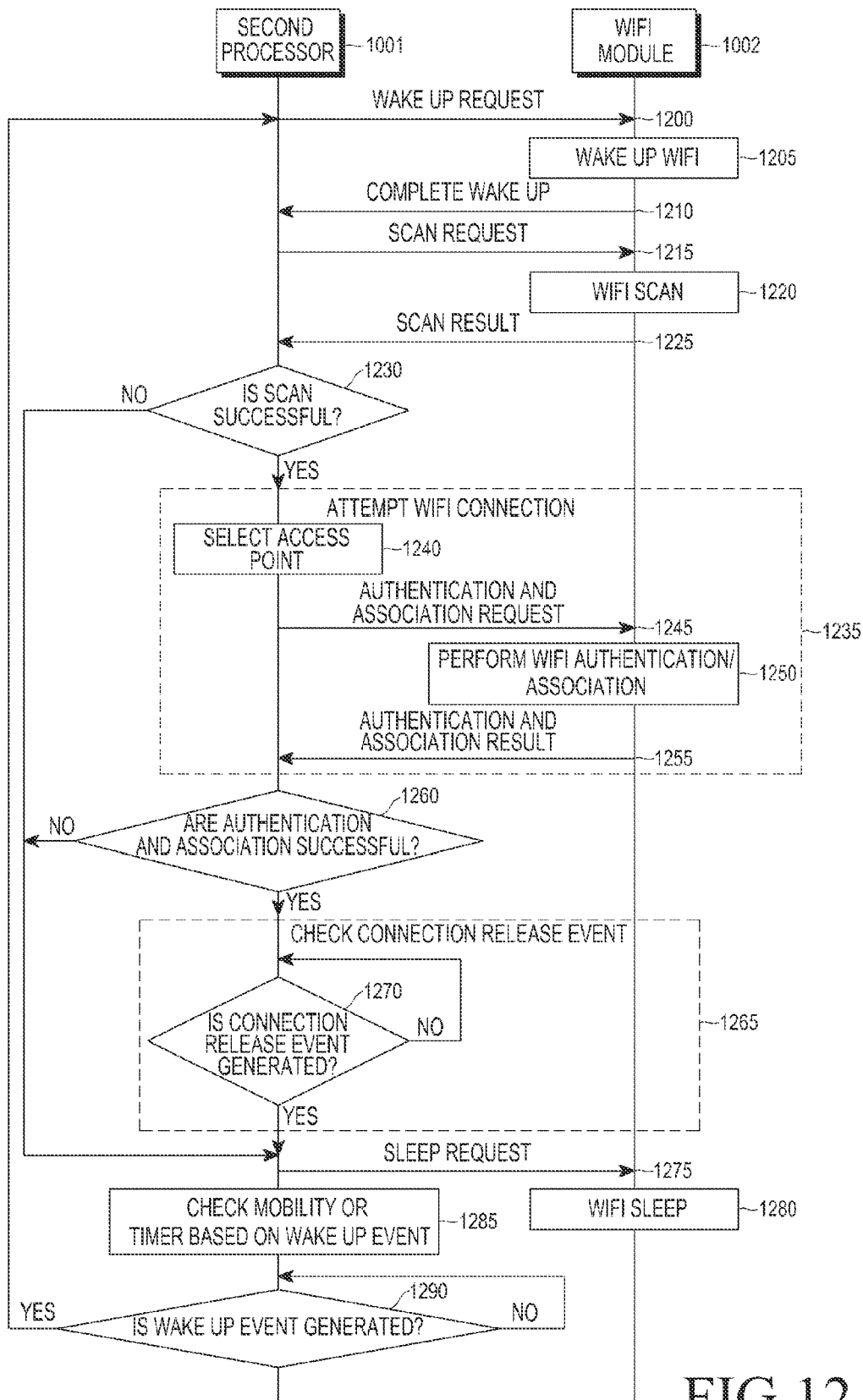
FIG. 12 illustrates a signal transmission/reception process for a WiFi communication control between a second processor and a WiFi module according to various embodiments of the present disclosure.

Additional information on the operation of the second processor 1001 will be provided with reference to FIG. 12.

FIG. 12 is a flowchart illustrating a signal transmission/reception process for a WiFi communication control between the second processor and the WiFi module according to various embodiments of the present disclosure.

Referring to FIG. 12, when the second processor 1001 transmits a wake up request to a WiFi module 1002 in operation 1200, the WiFi module 1002 wakes up in operation 1205. When the WiFi module 1002 informs of the wake up completion in operation 1210, the second processor 1001 may request a scan in operation 1215. At this time, the WiFi module 1002 may also transmit information on an access point to be scanned for when transmitting the scan request. Then, the WiFi module 1002 may perform the scan in operation 1220 and transmit a result of the scan in operation 1225.

The second processor 1001 may determine whether the scan is successful based on the scan result provided from the WiFi module 1002 in operation 1230. When the scan is successful, that is, when the access point is found, the second processor 1001 may attempt a WiFi connection in operation 1235. To this end, the second processor 1001 may select an access point in operation 1240 and transmit a request for authentication and association of the selected access point to the WiFi module 1002 in operation 1245. Then, the WiFi module 1002 may perform the authentication and association of the selected access point in operation 1250 and transmit a result of the authentication and association in operation 1255. Based on the result, the second processor 1001 may determine whether the authentication and association are successful in operation 1260. When the authentication and association are successful, the second processor 1001 may check an event 1265 for releasing the connection. Accordingly, the second processor 1001 may wake up at every DRX period to check a WiFi connection state, and may determine whether a connection release event is generated in operation 1270.

Meanwhile, when it is determined that the scan fails in operation 1230, the authentication and association fail in operation 1260, or the connection release event is generated in operation 1270, the second processor 1001 may proceed to operation 1275 and request the sleep mode so that the WiFi module 1002 enters the sleep state. Alternatively, the second processor 1001 may block power supplied to the WiFi module 1002. Accordingly, the WiFi module 1002 may enter the sleep mode in operation 1280. Then, the second processor 1001 may check mobility or the timer based on a wake up event in operation 1285. For example, when the electronic device moves to a WiFi network and the time to transmit reserved data arrives, it may be considered that the wake up event is generated. Accordingly, when the wake up event is generated in operation 1290, the second processor 1001 may return to operation 1200 to wake up the WiFi module 1002.

Hereinafter, various embodiments of the present disclosure discussed in the detailed description of the present disclosure will be classified as follows. One embodiment of the present disclosure relates to a method of maintaining a continuous WiFi connection, another embodiment of the present disclosure relates to a WiFi connection method using a timer, and still another embodiment of the present disclosure relates to a WiFi connection method when there is reserved data to be transmitted.

Figure 13:
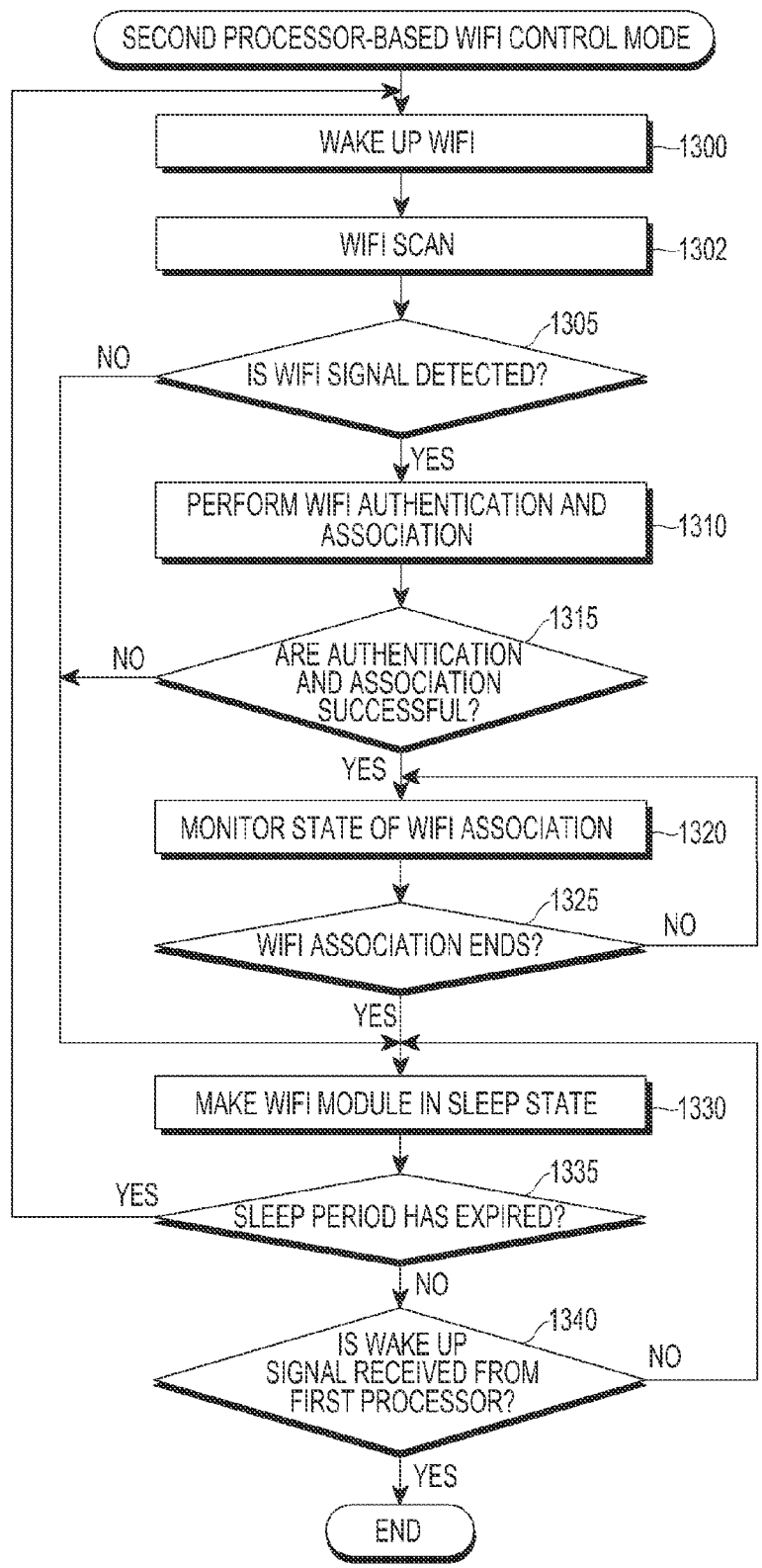
FIG. 13 is a flowchart illustrating an operation for maintaining a continuous WiFi connection according to an embodiment of the present disclosure.

FIG. 13 is a flowchart illustrating an operation for maintaining a continuous WiFi connection according to an embodiment of the present disclosure.

The second processor 1001 may wake up the WiFi module 1002 in operation 1300 and instruct a WiFi scan in operation 1302. When a WiFi signal is detected in response to the WiFi scan instruction in operation 1305, the second processor 1001 may control the WiFi module 1002 to perform WiFi authentication and association for the found access point in operation 1310. When the authentication and association are successful in operation 1315, the second processor 1001 may monitor a WiFi association state in operation 1320. Unless WiFi disassociation is made in operation 1325, the second processor 1001 may return to operation 1320 to maintain the WiFi connection state. That is, the WiFi connection is maintained by the disassociation, and the second processor 1001 may switch the WiFi module 1002 to the sleep state in operation 1330 after the disassociation. At this time, when the WiFi signal is not detected in operation 1305, that is, there is no scan result, or when the authentication or association fail in operation 1315, the second processor 1001 may switch the WiFi module 1002 to the sleep state in operation 1330.

Subsequently, it is determined whether the sleep period has expired in operation 1335. When the sleep period has expired, the second processor 1001 may return to operation 1300 to wake up the WiFi module 1002 and repeatedly perform the above described process. When the sleep period has not expired, it is determined whether a wake up signal is received from the first processor 1000 in operation 1340. When the wake up signal is received, a first processor-based WiFi control mode may be released. However, if the wake up signal is not received, the process may return to operation 1330.

Further, the WiFi disassociation may be determined according to a connected access point. For example, a home network or a WiFi network which requires a continuous connection may not perform the disassociation when there is the association with the corresponding access point. To this end, the electronic device may mange an access point list which does not require the disassociation, and the access point list may be exchanged between the first processor 1000 and the second processor 1001 during a process of assigning the WiFi control right.

Figure 14:
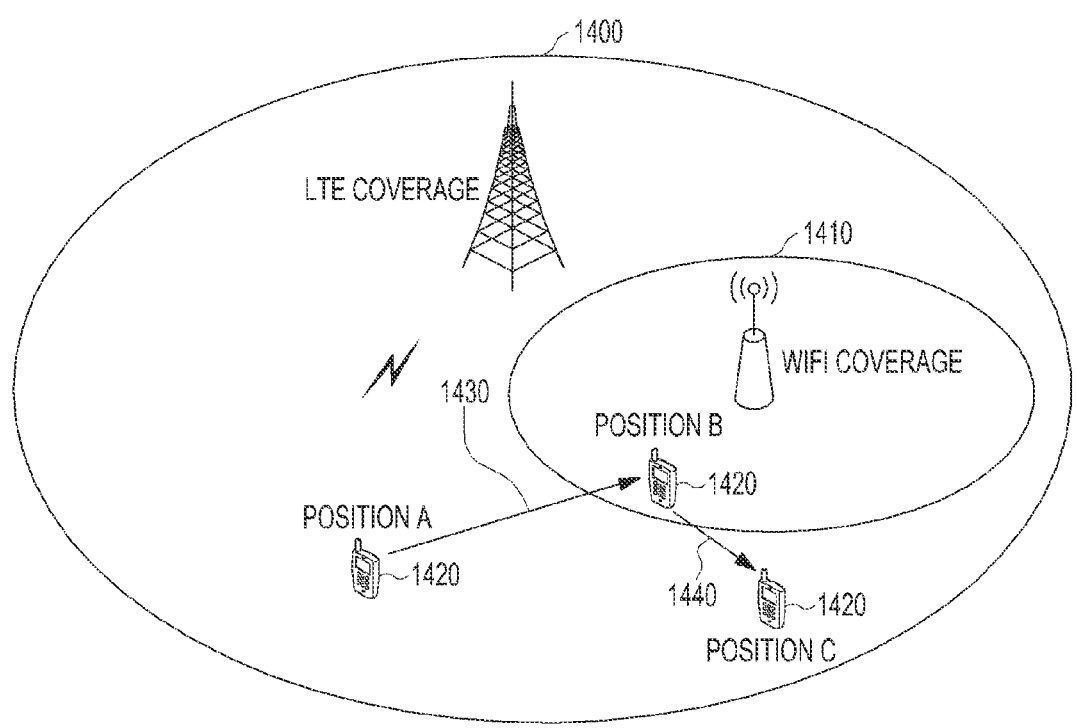
FIG. 14 illustrates a WiFi connection process based on a position of an electronic device according to various embodiments of the present disclosure.

FIG. 14 illustrates a WiFi connection process based on a position of the electronic device according to various embodiments of the present disclosure.

Referring to FIG. 14, when an electronic device 1420 within an LTE coverage 1400 moves to position B within a WiFi coverage 1410 from position A as indicated by reference numeral 1430, the electronic device 1420 attempts a WiFi connection. In contrast, when the electronic device moves to position C within the LTE coverage 1400 as indicated by reference numeral 1440 while transmitting/receiving data in position B through WiFi communication, WiFi disassociation is made. At this time, even though the electronic device is located at position B within the WiFi coverage 1410, the electronic device may stay there for a while and move without the use of actual WiFi data. In this case, when there is no use of the data, the WiFi connection may be disassociated to reduce power consumption. Such an operation process will be described with reference to FIG. 15.

Figure 15:
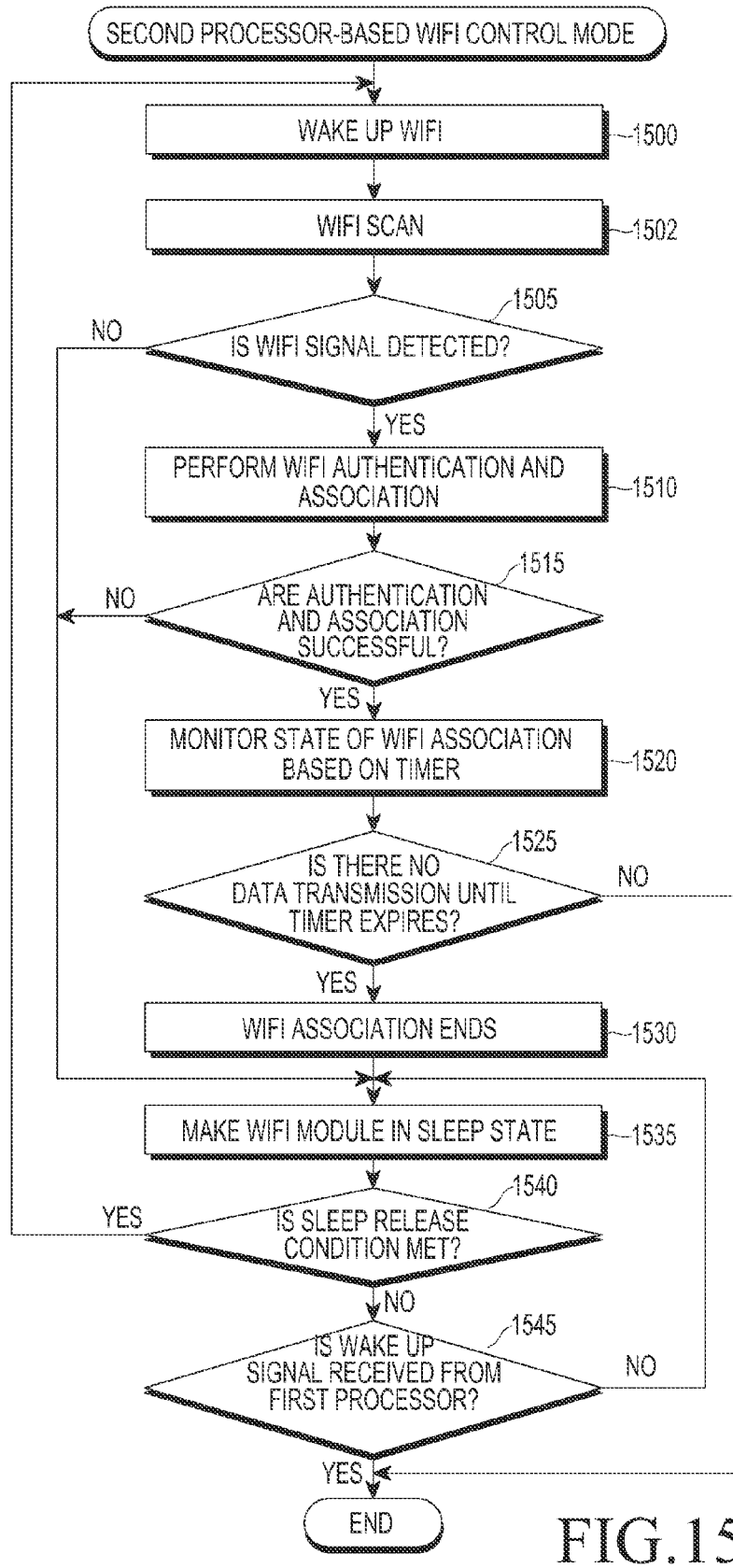
FIG. 15 is a flowchart illustrating an operation for a WiFi connection using a timer according to an embodiment of the present disclosure.

FIG. 15 is a flowchart illustrating an operation for a WiFi connection using a timer according to an embodiment of the present disclosure. Since operations 1500 to 1515 and 1545 of FIG. 15 are similar to operations 1300 to 1315 and 1340 of FIG. 13, detailed descriptions thereof will be omitted.

Referring to FIG. 15, when the WiFi authentication and association are successful in operation 1515, the second processor 1001 may drive a timer and then monitor a WiFi association state based on the timer in operation 1520. Subsequently, it is determined whether there is data transmission until the timer expires in operation 1525. When there is no data to be transmitted until the timer expires, the WiFi connection is disassociated and then may switch to the sleep state in operation 1530. As described above, when the data transmission is not performed for a predetermined time, the WiFi connection is released to reduce power consumption.

Meanwhile, the WiFi module 1002 having entered the sleep state may remain in the sleep state in operation 1535 until a predetermined time elapses in the timer or before the WiFi module 1002 wakes up by WiFi scan triggering based on mobility information.

After the disassociation and the entrance of the WiFi module 1002 to the sleep mode, the second processor 1001 may determine whether a sleep release condition is met in operation 1540. The sleep release condition may be checked when a sleep period expires or based on mobility information of the electronic device. Accordingly, when the sleep release condition is met, the WiFi module 1002 may wake up the WiFi module 1002 again and return to operation 1500 to perform the connection process.

As described above, by using the mobility information of the electronic device, the scan periodically performed when there is no mobility of the electronic device can be stopped in a state where there is no WiFi network which can be accessed based on a scan result, thereby reducing power consumption. The mobility information of the electronic device may be monitored by the second processor 1001 and thus WiFi communication may be controlled by the second processor 1001. When no access point is found and thus no WiFi signal is detected based on the scan result in operation 1505 or when the association is not possible in operation 1515, the second processor 1001 may control a sleep period of the WiFi module 1002 by using a predetermined time or mobility information in order to reduce power consumption generated due to unnecessary operations.

Further, after the electronic device ends the association in position B of FIG. 14, the second processor 1001 may schedule next wake up and scan operations by using the mobility information and timer operations. At this time, sleep modes due to different causes such as scan failure, association failure, and disassociation may have different durations. Further, when the sleep timer is configured as "0", the sleep may bypass.

Figure 16:
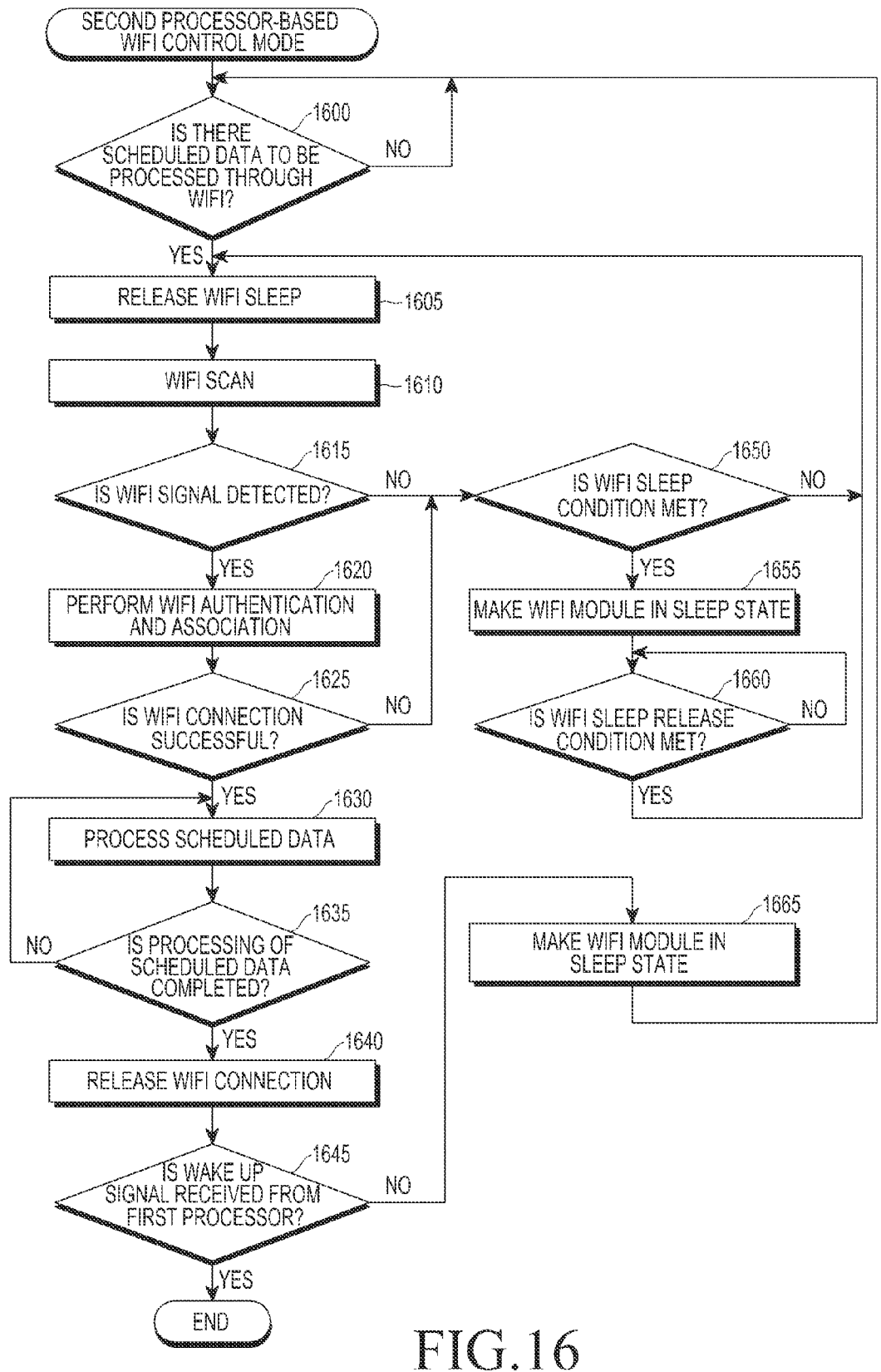
FIG. 16 is a flowchart illustrating an operation for a WiFi connection when there is scheduled data to be transmitted according to an embodiment of the present disclosure.

FIG. 16 is a flowchart illustrating a WiFi connection operation when there is reserved data to be transmitted according to an embodiment of the present disclosure.

Referring to FIG. 16, when a second processor 1001-based WiFi control mode starts, the second processor 1001 may determine whether there is scheduled data to be processed through WiFi in operation 1600. When there is the scheduled data, the second processor 1001 may perform an operation of releasing the sleep mode of the WiFi module 1002 in operation 1605. Since operations 1610 to 1620 of FIG. 16 are almost similar to operations 1300 to 1310 of FIG. 13, detailed descriptions thereof will be omitted.

However, the WiFi connection in the process of FIG. 16 is made only when there is scheduled data to be transmitted through the WiFi network. When the WiFi connection is successful, the scheduled data may be processed through WiFi communication in operation 1630. At this time, in order to process the scheduled data, the second processor 1001 may wake up the first processor 1000. Accordingly, when the scheduled data is completely processed in operation 1635, the first processor 1000 may disassociate the WiFi connection, that is, release the WiFi connection in operation 1640. Subsequently, unless the second processor 1001 receives a wake up signal from the first processor 1000 in operation 1645, the second processor 1001 may switch to the sleep state in operation 1665 and then return to operation 1600. That is, since the scheduled data is all processed, the second processor 1001 maintains the WiFi module 1002 in the sleep state. Further, since the second processor 1001 does not need to wake up the WiFi module 1002 before there is new data to be transmitted, the second processor 1001 returns to operation 1600. Alternatively, when capacity of the data to be transmitted is equal to or smaller than a predetermined size, the second processor 1001 may process the scheduled data rather than waking up the first processor 1000. The processing of the scheduled data will be described through FIG. 17.

Further, when the WiFi signal is not detected in operation 1615 or the WiFi connection fails in operation 1625, operation 1650 is performed. When a WiFi sleep condition is met in operation 1650, the WiFi module enters the sleep state in operation 1655. Then, unless the WiFi sleep release condition is met in operation 1660, the sleep state of the WiFi module may be maintained.

In contrast, when a wake up signal is received from the first processor 1000 in operation 1645 after the WiFi connection is released, the second processor 1001-based WiFi control module may end.

Meanwhile, the WiFi connection control may be operated based on a task to transmit scheduled data. That is, operations 1630 and 1635 of FIG. 16 may be performed by the first processor 1000 or the second processor 1001. This will be described in detail.

When transmission of scheduled data through the WiFi network is required, the WiFi control may be performed by the second processor 1001 even in the sleep state of the electronic device or the inactive state of the first processor 1000. In contrast, when there is no task to be performed since the transmission of the scheduled data is completed, the WiFi module 1002 may be continuously maintained in the sleep state before another task appears. Information on the existence of the task may be transmitted to the second processor 1001 at a time point when the WiFi control right is exchanged between the first processor 1000 and the second processor 1001 while the first processor 1000 enters the sleep state.

The second processor 1001 searches for the WiFi network in an idle state of the electronic device, and an operation after the WiFi network is connected may vary depending on the implementation. That is, when the second processor 1001 can perform the transmission of the scheduled data, the second processor 1001 may transmit the scheduled data through the WiFi module 1002 and then the WiFi module 1002 may enter the sleep mode. When the first processor 1000 transmits the scheduled data, the second processor 1001 may wake up the first processor 1000 after the second processor 1001 searches for the WiFi network and establishes the WiFi connection. Accordingly, the first processor 1000 can transmit the scheduled data, and enter the sleep state again after the transmission of the scheduled data is completed.

As described above, although FIGS. 13, 15, and 16 illustrate various divided embodiments of the method of maintaining the WiFi connection according to the present disclosure, the method may be implemented in a single or a combination form.

Meanwhile, when the second processor 1001 is the CP, the second processor 1001 may periodically wake up to perform an LTE operation in an LTE idle DRX mode even though the electronic device or the first processor 1000 is in the inactive state. According to various embodiments of the present disclosure, the WiFi control is performed while the second processor 1001 is awoken through the use of such periodic operation characteristics of the second processor 1001. Operations for the WiFi control may be performed according to a DRX period when the second processor 1001 wakes up, and the second processor 1001 may return to the sleep state after receiving a result of the WiFi control. Further, the second processor 1001 may enters the sleep state after transmitting a command to the WiFi module 1002 and wake up every DRX period to check a response to the corresponding command, so as to perform the following operations.

Hereinafter, a processor in which the user transmits data through WiFi while not recognizing a delay due to a WiFi connection even when the user starts a data transmission operation in a state where the second processor 1001 makes the WiFi module 1002 in a sleep state described in the embodiments of FIGS. 13, 15, and 16 according to various embodiments of the present disclosure will be described with reference to FIG. 17.

Figure 17:
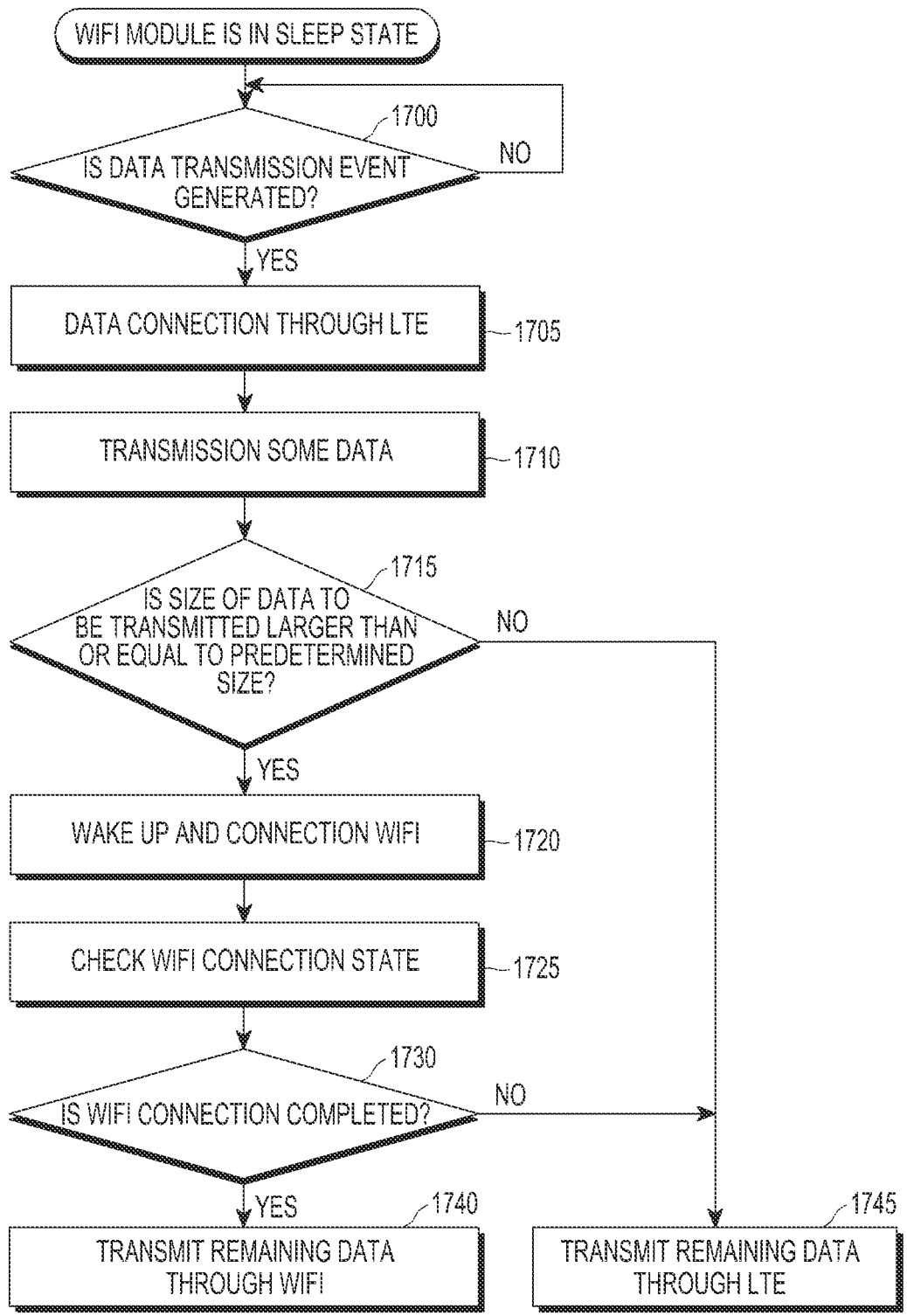
FIG. 17 is a flowchart illustrating an operation for data transmission through WiFi in a sleep state of a WiFi module according to various embodiments of the present disclosure.

FIG. 17 is a flowchart illustrating an operation for data transmission through WiFi in a state where the WiFi module is in a sleep state according to various embodiments of the present disclosure.

First, in a state where the WiFi module 1002 enters a sleep state or a power off state, data communication may start after push or notification is received in a network or by a user's intent. In order to provide the WiFi connection enabling the user to not feel a delay due to the WiFi connection even when the data communication is triggered by the user's action in the state the WiFi module 1002 is in the sleep state, the second processor 1001 may operate as illustrated in FIG. 17.

Referring to FIG. 17, when the WiFi module 1002 is in a HardWare (H/W) sleep state, if a data transmission event is generated as data communication is started after push or notification is received in a network or by a user's intent in operation 1700, specified data (for example, a paging signal or a signal of a control channel) may be transmitted through an LTE network in operation 1710 after a data connection through LTE is made in operation 1705.

Accordingly, the second processor 1001 may determine whether a size of the data to be transmitted is larger than or equal to a predetermined size in operation 1715. For example, when the size of the data to be transmitted is not larger than or equal to the predetermined size, the remaining data may be transmitted through the LTE network in operation 1745.

In contrast, when the size of the data to be transmitted is larger than or equal to the predetermined size, the second processor 1001 may wake up the WiFi module 1002 and attempt the WiFi connection in operation 1720. At this time, the waking up of the WiFi module 1002 may be enabled when the size of the data to be transmitted is larger than or equal to the predetermined size. The second processor 1001 may first make a request for Hypertext Transfer Protocol (HTTP) header information to identify the size of the data to be transmitted. Transmission of data having a size equal to or smaller than a predetermined size through the LTE network may be performed long enough to cover the time during which the WiFi connection is performed by an HTTP range command.

Thereafter, a WiFi connection state is checked in operation 1725. When the WiFi connection is completed in operation 1730, the data transmission/reception performed through the LTE network is performed through the WiFi network in operation 1740. That is, the remaining data may be transmitted/received through the WiFi network. Since the WiFi network connection is made while the data transmission/reception is performed through the LTE network in the beginning of the process, the user does not recognize the disconnection of the data, thereby implementing the continuous WiFi connection without inconveniencing the user. When the WiFi connection is not completed in operation 1730, the remaining data may be transmitted through the LTE network in operation 1745.

In such a method, WiFi cannot be applied to network oriented data transmission. In most network oriented data transmissions in a cellular network, a large capacity file is rarely transmitted directly to the electronic device. In most cases, data is transmitted to the electronic device through notification such as PUSH, and then received by the electronic device if the electronic device accepts/makes a request for the file reception. Accordingly, in the network oriented data transmission, the electronic device operates a seamless WiFi connection suggested by various embodiments of the present disclosure after receiving notification having a specified data size (for example, a paging signal or a signal of a control channel). Therefore, transmission/reception of data used in an LTE network is not much and the user may receive the WiFi connection having no delay through such a connection.

Figure 18:
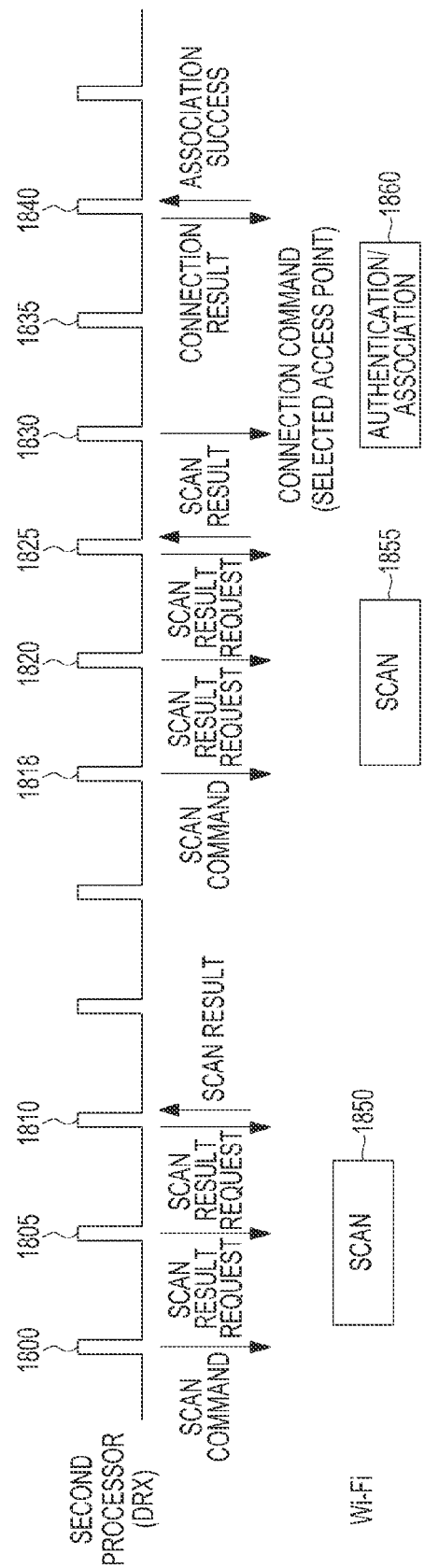
FIG. 18 illustrates a WiFi control process based on a Discontinuous Reception (DRX) period according to various embodiments of the present disclosure.

FIG. 18 illustrates a WiFi control process according to a DRX period by the second processor operating in a DRX mode according to various embodiments of the present disclosure. The second processor 1001 may periodically wake up in a DRX state and perform a WiFi control operation at the integer multiple time 1800 to 1840 of the waking up period.

Referring to FIG. 18, the second processor 1001 may enter a sleep state after transmitting a scan command 1800 to the WiFi module 1002, and then may check a scan result every waking up period.

When the second processor 1001 checks a result of the operation of the WiFi module 1002, the WiFi module 1002 may transmit a response. A method of transmitting interrupt to the second processor 1001 at a time point when the operation of the WiFi module 1002 ends can be used. However, since the method unnecessarily wakes up the second processor 1001, it is not helpful to optimize power. Therefore, only when there is a request from the second processor 1001, the WiFi module 1002 may transmit a response.

FIG. 18 illustrates a case where the second processor 1001, which has received a scan result according to a first scan operation 1850 by the WiFi module 1002, transmits no command after receiving the scan result according to various embodiments of the present disclosure. This is because no access point is found based on the scan result. In contrast, the second processor 1001, which has received a scan result according to a second scan operation 1855 by the WiFi module 1002, may transmit a command for connection to a found access point to the WiFi module 1002 at a period 1830 after the period when the scan result is received. That is, when an access point is found based on the scan result, a series of operations for controlling the WiFi module 1002 may be performed.

Specifically, when the second processor 1001 receives a scan result including information on the found access point from the WiFi module 1002, the second processor 1001 may compare the scan result received from the WiFi module 1002 with an access point list preferred by the user to select an access point for the later connection process. Accordingly, the second processor 1001 may transmit information for the connection to the selected access point to the WiFi module 1002 and instruct an authentication and association operation at the period 1830. All the instructions may be transmitted to the WiFi module 1002 at periods when the second processor 1001 wakes up in the DRX mode. The WiFi module 1002 may perform scan operations 1850 and 1855 in response to the scan instructions, and may perform the authentication and association operation 1860 in response to the connection instruction 1830. The second processor 1001 may control the WiFi connection by checking the connection state at every DRX period after instructing the authentication and association operation.

Figure 19:
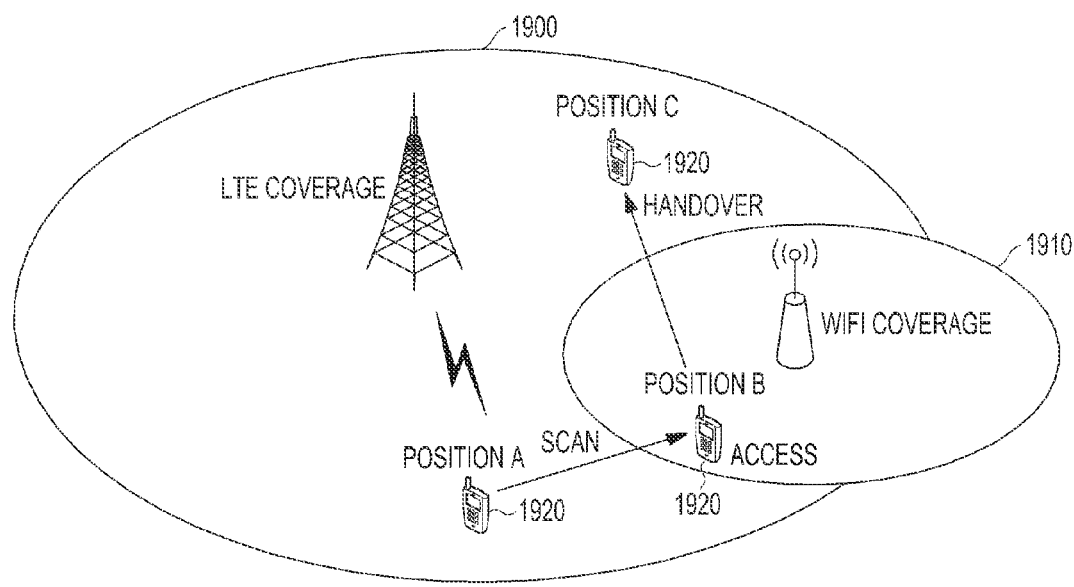
FIG. 19 illustrates a handover between a Voice over Long Term Evolution (VoLTE) call and a WiFi call based on a position of an electronic device according to various embodiments of the present disclosure.

FIG. 19 illustrates a handover between a VoLTE call and a WiFi call based on a position of an electronic device according to various embodiments of the present disclosure.

FIG. 19 shows a case where an electronic device 1920 moves to position B of a WiFi coverage 1910 from position A of an LTE coverage 1900 and then moves to position C of the LTE coverage 1900. When the user moves to position B of the WiFi coverage 1910 while using a VoLTE call through the electronic device 1920, a handover to a WiFi call from the VoLTE call may be required. In general, when the electronic device is configured as a WiFi preferred mode, the electronic device may find an available WiFi connection and then transmit/receive data through a WiFi network, not through an LTE network. The VoLTE call is handed over to the WiFi call preferentially through the WiFi network connection. Particularly, in a case of the VoLTE call, resources used for actual data transmission are small. However, due to the use of resources of control channels for control information, the resources may reach the limit of a control channel capacity, so that inefficient resource allocation may be made in the network. Further, since data re-transmission is performed by dynamic scheduling even when a semi-persistent scheduling data service is used, control channel resources are encroached. For this reason, a handover through a service provider WiFi network which meets VoLTE call quality may be required.

When the user uses only a VoLTE call without other data transmission while a call is made through the VoLTE call in various embodiments of the present disclosure, an AP enters a sleep state to minimize power consumption. In this case, when the electronic device is configured to prefer a WiFi call, the electronic device may find the WiFi network and prefer to hand over the VoLTE call to a WiFi call. To this end, a WiFi scan and connection operation may be required during the VoLTE call.

A process for the handover between the VoLTE call and the WiFi call according to various embodiments of the present disclosure will be described with reference to FIG. 20.

Figure 20:
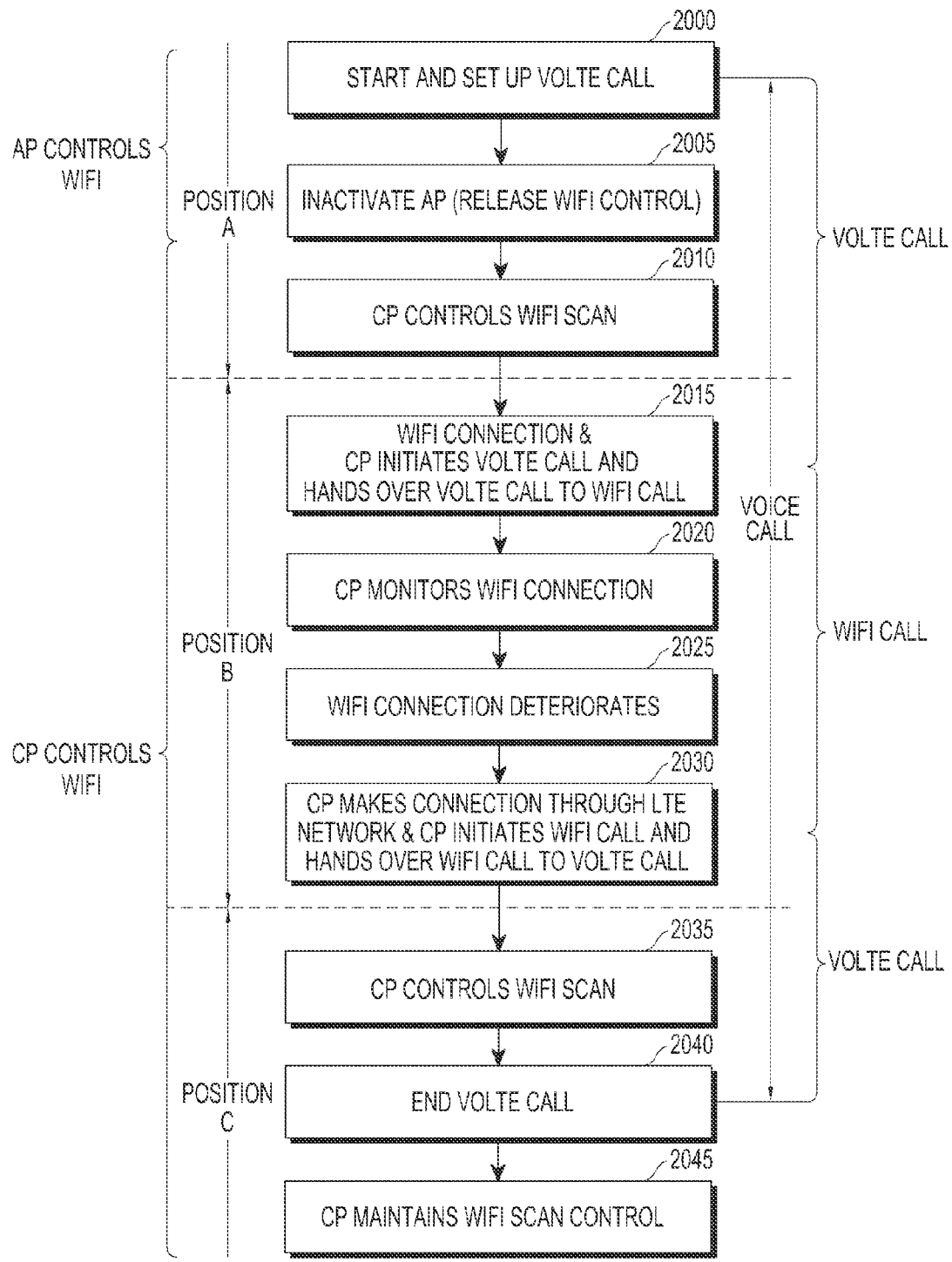
FIG. 20 is a flowchart illustrating a handover between a VoLTE call and a WiFi call according to various embodiments of the present disclosure.

FIG. 20 is a flowchart illustrating a handover between a VoLTE call and a WiFi call according to various embodiments of the present disclosure. FIG. 20 illustrates an example in which a first processor is an AP and a second processor is a CP which controls the VoLTE call.

First, referring to FIG. 20, the electronic device 1920 in position A of FIG. 19 is being used by the user, and accordingly in the active state. When the electronic device is configured in a WiFi preferred mode, the electronic device continuously scans a WiFi network. When the electronic device is connected through the WiFi network, the electronic device offloads an LTE network connection onto the WiFi network connection. However, since there is no WiFi network in position A, the AP controls the WiFi module to periodically scan the WiFi network.

In this case, when a VoLTE call starts and is established in operation 2000 as illustrated in FIG. 20, the AP enters an inactive state, that is, a sleep mode after a VoLTE call setup in operation 2005 to minimize power consumption. Accordingly, the AP may release a control of the WiFi module. Simultaneously, a WiFi control right is handed over to the CP from the AP. Since the electronic device is configured in the WiFi preferred mode, the electronic device may be required to find an available WiFi network for the handover to the WiFi call. To this end, the CP periodically performs a scan operation by the WiFi module 1002 to find a connectable WiFi network in operation 2010, and checks a connection state of a WiFi network found after movement to position B and determines the handover to the WiFi network.

When the CP determines the handover to the WiFi network to perform a handover process and the handover is made in operation 2015, the later process is performed through the WiFi call instead of the VoLTE call and the CP may continuously control the WiFi module 1002. In operation 2020, the CP may continuously monitor the WiFi connection state through the WiFi module. At this time, the CP may monitor a WiFi link status, a Received Signal Strength Indication (RSSI), and the existence or non-existence of a heavy traffic user.

Subsequently, when the WiFi connection state becomes bad based on a monitoring result in operation 2025 as the electronic device moves to position C of FIG. 19, the electronic device determines the handover from the WiFi call to the VoLTE call and proceeds to an LTE connection process in operation 2030. That is, after the LTE connection is completed and the VoLTE call is established, the AP enters the sleep mode and is not required to wake up for a voice call operation until the voice call ends. At this time, the CP serves to control WiFi for the handover from the VoLTE call to the WiFi call and the handover from the WiFi call to the VoLTE call, thereby minimizing power consumption. Accordingly, the CP may control a WiFi scan in operation 2035, and maintain a WiFi scan control in operation 2045 even though the VoLTE call ends in operation 2040. As described above, when the VoLTE call ends, the CP may continuously control the scan operation for the WiFi connection before the AP wakes up.

Meanwhile, during the process of the handover between the VoLTE and the WiFi call, the CP may further perform the following additional operations while controlling WiFi. For example, the CP may control a WiFi scan period using position information, mobility of the electronic device, and WiFi AP DataBase (DB) information, and optimize a WiFi scan operation for scanning only a particular access point by using the WiFi scan period. Further, when the CP finds an access point which meets a preset particular condition, the CP may make a control to stop the WiFi scan operation. The CP may check a WiFi connection state using a Cellular network and a WiFi network. The CP may optimize a WiFi scan operation and an association operation through a WiFi parameter control.

Meanwhile, the operation of the handover between the VoLTE call and the WiFi call will be described in more detail with reference to FIG. 21.

Figure 21:
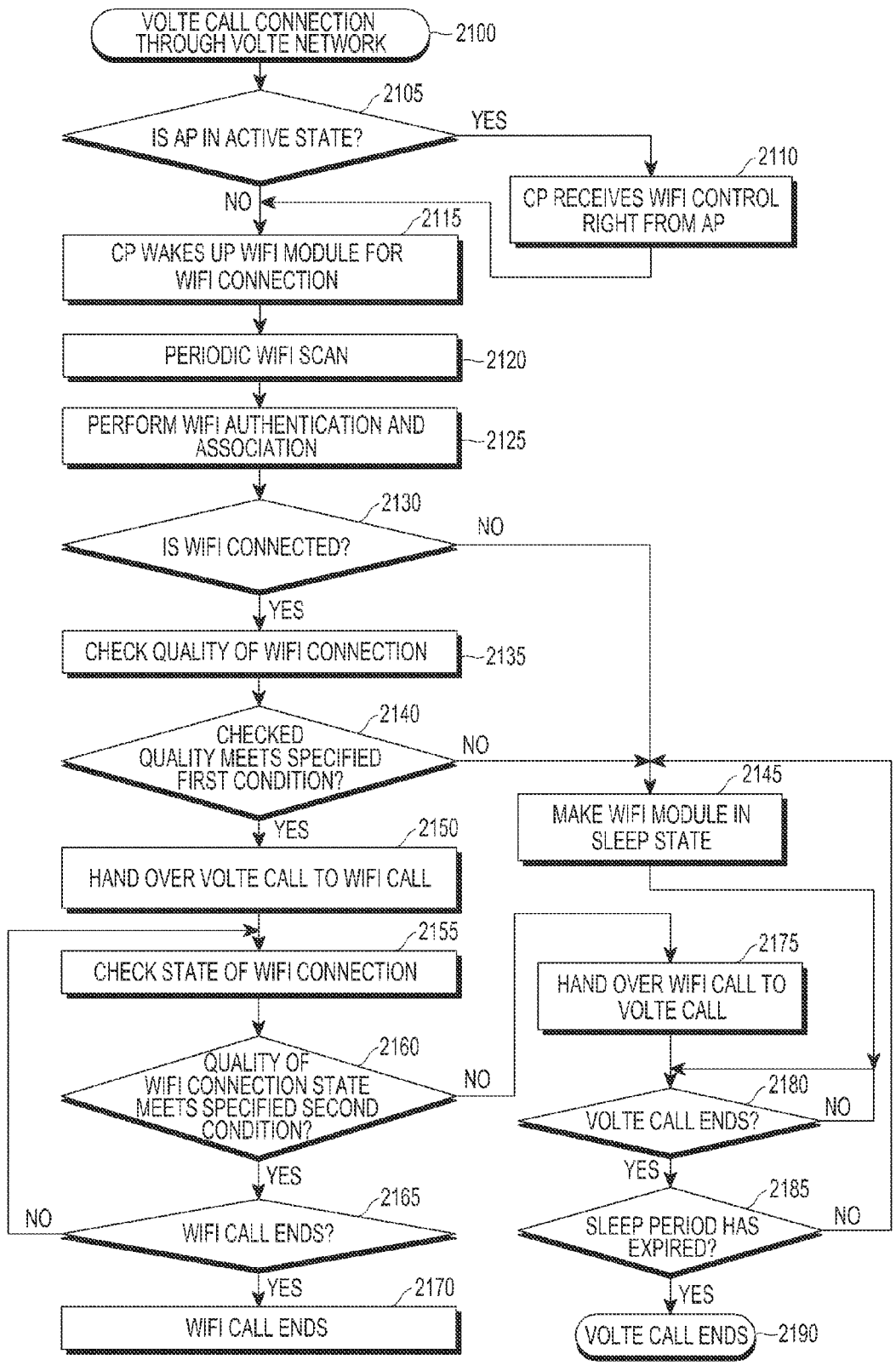
FIG. 21 is a flowchart illustrating an operation of a second processor for a handover between a VoLTE call and a WiFi call according to various embodiments of the present disclosure.

FIG. 21 is a flowchart illustrating an operation of a second processor for a handover between a VoLTE call and a WiFi call according to various embodiments of the present disclosure. FIG. 21 illustrates an example in which a first processor is an AP and a second processor is a CP.

Referring to FIG. 21, when a VoLTE call connection starts through a VoLTE network in operation 2100, the CP may determine whether the AP is in an active state in operation 2105. When the AP is in the active state, the CP may receive a WiFi control right from the AP in operation 2110. At this time, the AP having handed over the WiFi control right may be in a sleep state. In contrast, when the AP is not in the active state, for example, when the AP is in an inactive state such as a power off state or a sleep state, the CP may wake up the WiFi module for a WiFi connection in operation 2115. Subsequently, the CP may give instructions for the performance of a periodic WiFi scan in operation 2120 and give instructions for the performance of WiFi authentication and association based on a scan result in operation 2125. The WiFi connection through the WiFi authentication and association may be made through an instruction by the CP or made by the WiFi module after receiving required information from the CP.

For example, an access point installed by a network service provider requires Universal SIM (USIM) information of the user. In this case, when the WiFi module directly receives USIM information from the CP without passing through the AP, the WiFi module obtains information required for connecting the access point. Thereafter, the WiFi module may make a connection to the access point by using the USIM information received from the CP through authentication and association without a connection instruction from the CP based on a scan result. Accordingly, the CP determines whether WiFi is connected in operation 2130. When WiFi is connected, that is, when the connection to the found access point is successful, the CP may check quality of the WiFi connection to the connected access point in operation 2135.

The CP may determine whether the checked quality meets a specified first condition in operation 2140. When the checked quality meets the specified first condition, the CP may consider that the connected access point has good signal quality and perform a handover to a WiFi call from a VoLTE call in operation 2150. Thereafter, since a WiFi connection state may vary depending on various environment changes such as a WiFi link status and a received signal strength, it is required to continuously monitor the WiFi connection state.

Accordingly, the CP may check the WiFi connection state in operation 2155 to determine whether quality of the WiFi connection state meets a specified second condition in operation 2160. When the quality of the WiFi connection state meets the specified second condition, the CP may return to operation 2155 to perform a control for the WiFi call unless the WiFi call ends in operation 2165. When the WiFi call ends in operation 2165, the CP may control the WiFi module to end the WiFi call in operation 2170. At this time, even though the WiFi call ends, the CP may continuously control the scan operation for the WiFi connection before AP wakes up. Further, when the quality of the WiFi connection state does not meet the specified second condition in operation 2160, the CP may perform the handover to the VoLTE call from the WiFi call in operation 2175. Accordingly, the CP may perform a control for the VoLTE call before the VoLTE call ends in operation 2180.

In contrast, when the WiFi connection fails in operation 2130 or the checked quality does not meet the specified first condition in operation 2140, the CP may change the WiFi module to the sleep state in operation 2145. The CP may reset a timer to check a sleep period of the WiFi module and then starts counting while making the WiFi module in the sleep state. When the WiFi connection fails, the handover to the WiFi call cannot be made any more, so that the WiFi module enters the sleep mode. Further, when the checked quality does not meet the specified first condition and thus the WiFi connection state is bad even though WiFi is connected, the WiFi call through the WiFi network cannot be guaranteed, so that the WiFi module enters the sleep state. Accordingly, after the WiFi module enters the sleep mode, operation 2180 is performed to determine whether the VoLTE call ends. When the user presses a call termination key to end the VoLTE call, the CP determines whether a sleep period of the WiFi module expires based on the timer in operation 2185. When the sleep period expires, the CP ends the VoLTE call in operation 2190. As described above, when the sleep period of the WiFi module does not expire even though the VoLTE call ends, the WiFi scan control may be maintained.

Meanwhile, even in the inactive state such as the power off state of the sleep state of the AP according to various embodiments of the present disclosure, a WiFi scan method using the CP supporting a cellular connection may be used for power consumption in positioning the electronic device.

As a service using position information of the electronic device gradually increases, a positioning service of the electronic device recently becomes one of the important functions. The service using position information of the electronic device requires tracking a position even in the sleep state of the electronic device in order to start a linked service after recognizing a particular region. For example, when the user enters a particular position, an advertisement or discount information may be pushed to the electronic device or a particular operation registered by the user may be performed. For such a service, tracking in the sleep state of the electronic device is required, and not only cellular base station information but also access point information are used for the position, thereby acquiring more accurate position information.

In this case, the continuous or periodic WiFi scan operation should be performed. The CP operating in the LTE DRX mode when the electronic device is in the sleep state may power-efficiently acquire the scan information through the WiFi control whenever waking up periodically in the DRX mode.

Figure 22:
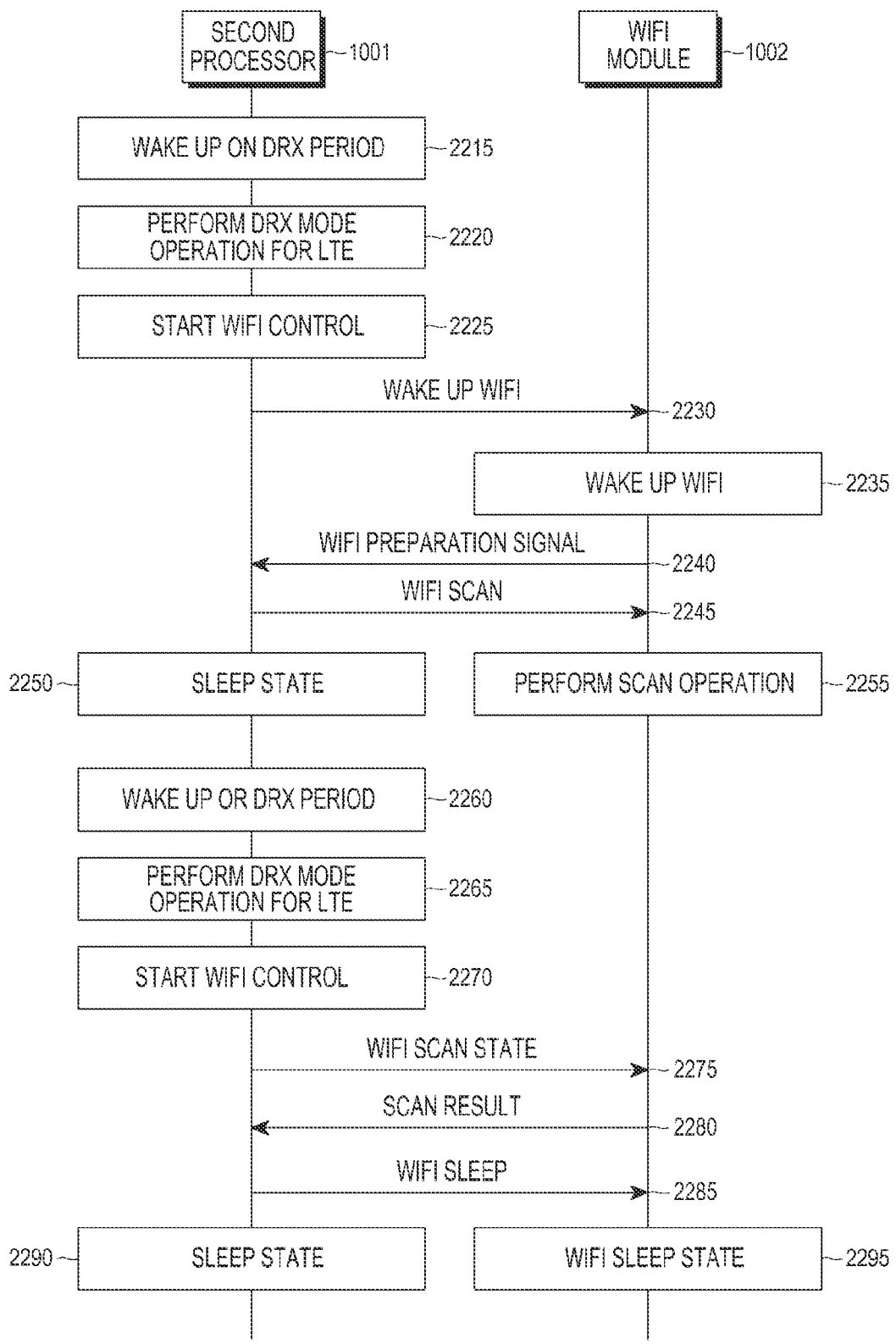
FIG. 22 illustrates a WiFi control processor for a positioning service according to various embodiments of the present disclosure.

Such an operation will be described with reference to FIG. 22, which illustrates a WiFi control process for a positioning service according to various embodiments of the present disclosure. FIG. 22 illustrates an example in which a first processor is an AP and a second processor is a CP.

Referring to FIG. 22, when the second processor 1001 wakes up at a DRX in operation 2215, the second processor 1001 may perform a DRX mode operation to perform a predetermined LTE operation in operation 2220. Subsequently, the second processor 1001 may control the WiFi module in operation 2225. Accordingly, the second processor 1001 may transmit a WiFi waking up command to the WiFi module 1002 in operation 2230 to wake up the WiFi module 1002 in operation 2235, and then receive a WiFi preparation signal in operation 2240 to instruct a scan operation in operation 2245. The WiFi module 1002 may perform the scan operation in operation 2255 in response to the scan operation instruction.

In order to reduce power consumption, the second processor 1001 may enter a sleep state in operation 2250 and wake up every DRX wake up period in operation 2260 to simultaneously perform a DRX mode operation in operation 2265 and start a WiFi scan control in operation 2270. Accordingly, the second processor 1001 may obtain a scan result in operation 2280 by inquiring about a WiFi scan state in operation 2275. After identifying the scan result, the second processor 1001 transmits a sleep command to make the WiFi module 1002 in the sleep state in operation 2285, and the WiFi module 1002 may enter the sleep state in operation 2295. Alternatively, the second processor 1001 may control the WiFi module 1002 to be in a power off state. Further, the second processor 1001 may enter the sleep state again to reduce power consumption in operation 2290.

The scan result provided from the WiFi module 1002 every DRX wake up period may be used later for a positioning service together with base station information acquired from the LTE network. The scan result provided from the WiFi module 1002 may include information required for the positioning service such as information on the found access point and an RSSI of each access point. When the second processor 1001 controls the WiFi module 1002 according to the DRX period, the second processor 1001 may transmit the scan command, enter the sleep mode, and then check the scan result every DRX wake up period, or the second processor 1001 may transmit the scan command and then enter the sleep mode after waiting until the scan result is received, but the present disclosure is not limited thereto.

According to various embodiments of the present disclosure, it is possible to provide a power optimized service by efficiently controlling WiFi even in a system in which cellular and WiFi interwork with each other. For example, the system in which cellular and WiFi interwork with each other may include Internet Protocol (IP) flow mobility and seamless offload (IFOM). When the network or the electronic device transmits particular traffic according to a predetermined traffic offloading rule, that is, in a case of a large capacity data service, offloading to WiFi is preferred.

Figure 23:
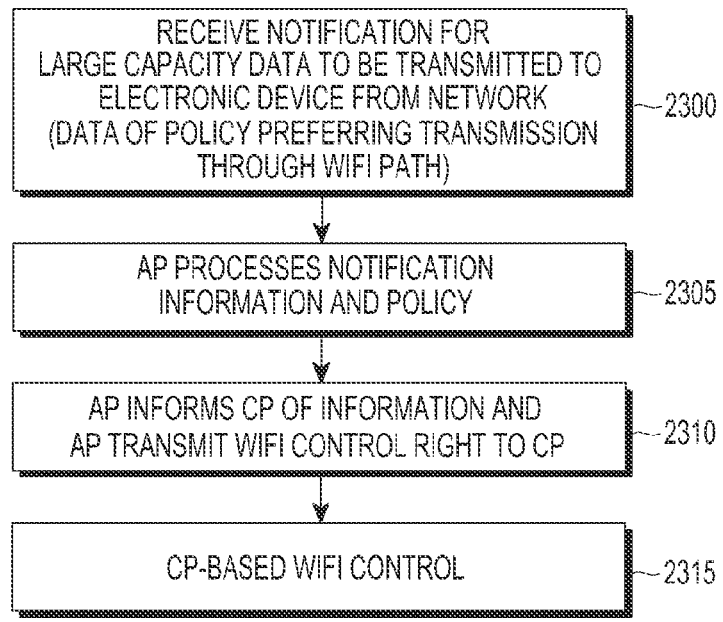
FIG. 23 illustrates a WiFi control processor for a large capacity data service according to various embodiments of the present disclosure.

FIG. 23 illustrates a WiFi control process for a large capacity data service according to various embodiments of the present disclosure. FIG. 23 illustrates an example in which a first processor is an AP and a second processor is a CP.

Referring to FIG. 23, when the electronic device is in the sleep state, data transmission to the electronic device from the network through a WiFi connection may be required. Alternatively, for example, data which the electronic device will download is generated in a cloud server or multimedia contents for the electronic device may be transmitted through a Social Networking Service (SNS). At this time, the electronic device may receive notification in a push message type from the network through a cellular network in operation 2300. Large capacity data may be data according to a policy in which transmission on a WiFi path is preferred.

In response to the notification, the AP of the electronic device may wake up to process the notification in operation 2305. Accordingly, the notification may be directly shown to the user through a screen and the AP may directly enter a sleep state to reduce power consumption. At this time, before entering the sleep state, the AP may inform the CP of the fact and transmit a WiFi right control to the CP in operation 2310. In response to the transmission of the WiFi control right, the CP may prepare a WiFi connection by controlling the WiFi module and a CP-based WiFi control may be performed in operation 2315.

Although FIG. 23 illustrates a case where the AP wakes up to process notification information, hands over a WiFi control right to the CP, and then enters the sleep state again as an example, the processing of the notification information may be performed by the CP. Further, the AP may wake up when receiving notification from the network to hand over the WiFi control right to the CP. In this case, when the user of the electronic device takes action to receive data, the data may be transmitted through the WiFi module under a control of the CP in the electronic device. In contrast, when the user of the electronic device does not want to receive the data for a predetermined time, the WiFi module may enter the sleep mode after the predetermined time to minimize power consumption as illustrated in FIG. 15. Further, when the user attempts the data transmission after the WiFi module enters the sleep state, the user may receive the data through a method illustrated in FIG. 17 or may receive data after waking up the WiFi module and waiting.

A method of controlling a communication module in an electronic device according to various embodiments of the present disclosure may include an operation in which a second processor receives a specified signal informing that a first processor enters an inactive state from an active state from the first processor; and an operation in which the second processor controls a WiFi communication function in response to the specified signal.

According to various embodiments of the present disclosure, the method may include an operation of receiving a signal informing that the first processor enters the active state from the inactive state from the first processor; and an operation for releasing a control of the WiFi communication function in response to the signal informing of the entrance to the active state.

According to various embodiments of the present disclosure, the method may further include an operation in which the second processor controls the WiFi communication function according to a communication period set to the second processor, and the set communication period may include a DRX period defined in the LTE standard.

According to various embodiments of the present disclosure, the method may further include an operation of receiving information related to the WiFi communication function from the first processor after receiving the specified signal, and the information includes information on one or more access points. The method may further include an operation in which the second processor makes a control to perform a scan or connection through the WiFi module based on the information.

According to various embodiments of the present disclosure, the inactive state may include one of the sleep state of the electronic device, the sleep state of the first processor, and the power off state of the first processor.

According to various embodiments of the present disclosure, the method may further include an operation in which the second processor makes a control to perform the scan through the WiFi modules in response to the specified signal when a VoLTE call is connected; and an operation of making a control to hand over the VoLTE call to a WiFi call based on a result of the scan, wherein the operation for making the control to hand over the VoLTE call to the WiFi call may include an operation for making a control to hand over the VoLTE call to the WiFi call when quality of a WiFi connection state meets a specified quality condition.

Further, the method of controlling the communication module in the electronic device according to various embodiments of the present disclosure may include an operation for activating a processor for controlling a cellular communication module; and an operation for at least temporarily controlling the WiFi module through the activated processor.

According to various embodiments of the present disclosure, the operation for activating the processor may include an operation for activating the processor to transmit/receive a specified cellular signal through the cellular communication module.

According to various embodiments of the present disclosure, the operation for at least temporarily controlling the WiFi module may include an operation for performing at least one of a scan or a connection for one or more access points through the WiFi module.

According to various embodiments of the present disclosure, the operation for at least temporarily controlling the WiFi module may include an operation in which the electronic device determines whether the other processor for controlling the WiFi module is in an inactive state; and an operation in which, when the other processor is in the inactive state, the processor at least temporarily controls the WiFi module.

Meanwhile, when general users desire to transmit large capacity data, they may hope to use a WiFi network to exchange the data free of charge. For this reason, when transmission/reception of large capacity data is required, actual transmission may be performed when the WiFi network is connected according to a user setting. For example, in a case of an application program update, the user may always use the latest application through a background update using a scheduled data transmission method according to various embodiments of the present disclosure. Further, in a case of data file synchronization with a cloud storage, large capacity file transmission/reception is required. Accordingly, by using the scheduled data transmission method according to various embodiments of the present disclosure, the user may maintain the file synchronization with a cloud storage server in the background. Through the use of the scheduled data transmission method according to various embodiments of the present disclosure, the user may perform WiFi-based transmission for sharing photo/video files in the SNS and for a web storage service.

Further, a CP-based WiFi control may be applied to a presence service using WiFi, thereby efficiently operating power. In this case, the electronic device may recognize a counterpart, which is located near the user, corresponding to a contact number and provide the counterpart to the user through a social network service. To this end, it is preferable to efficiently manage power for the presence check using WiFi even in the sleep state of the electronic device. Such an operation may implement efficient power management since the WiFi module 1002 is controlled to scan the surroundings whenever the CP wakes up every DRX period without interrupting the sleep of the AP while the electronic device is in the sleep state. The scan operation may be more power-efficiently implemented through a scan period control according to mobility of the electronic device using an LTE cellular network together with a positioning service of the electronic device.

Meanwhile, due to a tradeoff relationship formed between a WiFi data coverage and power consumed thereby, every user may have different requirements on the WiFi control. That is, while particular users may want to use as maximum WiFi connection as possible while not worrying too much about the reduction of battery lifetime, other users may want to use WiFi while generating as minimum power consumption as possible. In the latter case, the user may minimize power consumption while considering an inconvenience connection control, or may accept some data transfer through a cellular network to resolve the inconvenience of the connection control. In various embodiments of the present disclosure, a disassociation timer or a sleep time may have different values when the CP controls WiFi through a service providing scenario in such a situation.

Accordingly, by defining a mode in which different weighted values are assigned to tradeoff relationships between WiFi experience and WiFi data transmission/reception coverage and between WiFi control and operation power consumption, a right to select the mode may be provided to the user, and the CP may control WiFi according to the selected mode. For example, the mode may be classified into a user controlled mode, max WiFi mode, a balanced WiFi mode, and a low power WiFi mode. The user controlled mode is a mode in which the user directly controls WiFi on/off, the max WiFi mode is a mode in which the electronic device continuously connects WiFi as maximally as possible regardless of inactivation of the AP/electronic device, the balanced WiFi mode is a mode in which the max WiFi mode and the low power WiFi mode are combined, and the low power WiFi mode is a mode in which the WiFi module 1002 wakes up from the sleep state for the WiFi connection only when actual data transmission/reception is performed as illustrated in FIG. 16.

According to various embodiments of the present disclosure, when the electronic device transmits/receives data using short range communication (for example, WiFi communication or BT communication), the electronic device requires a periodic signal discovery through short range communication. However, the periodic signal discovery in a state where information required for the short range communication such as a communication state or a current position of the electronic device may be unnecessary. Accordingly, by controlling the periodic signal discovery in the state where there is no change in the state for the short rage communication, power consumption can be minimized.

Figure 24:
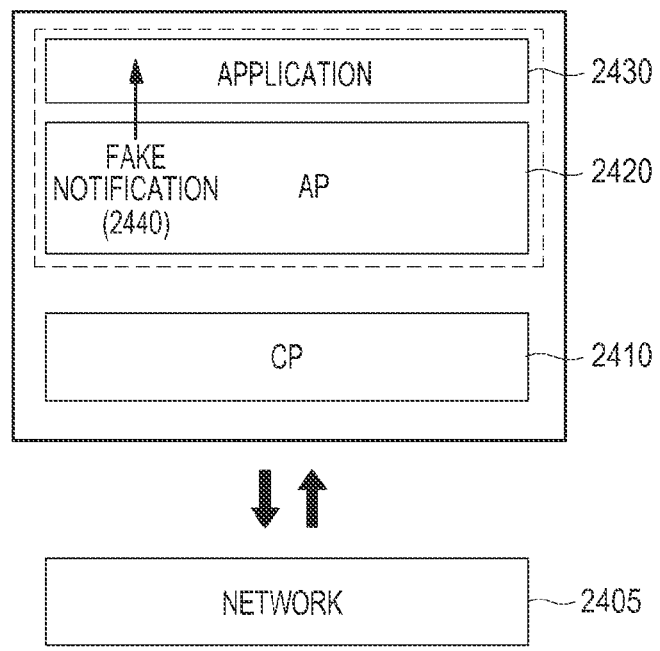
FIG. 24 illustrates an example in which an AP and a CP process a signal when a WiFi scan operation is limited according to various embodiments of the present disclosure.

FIG. 24 illustrates an example in which an AP and a CP process a signal when a WiFi scan operation is limited according to various embodiments of the present disclosure.

First, in a general mode, an AP 2420 may control the WiFi module to generate a search signal for a WiFi connection according to a WiFi scan request by an application 2430 or an Operating System (OS). In a sleep mode, when there is the WiFi scan request, the AP 2420 may inform a CP 2410 of the WiFi scan request and then allow the CP 2410 to control the WiFi module. At this time, even though the WiFi scan request corresponds to a periodic signal discovery request, when the CP 2410 blocks not to search for WiFi, power consumption can be reduced. However, when exception handling is performed on the WiFi scan request without actually performing the scan operation or a result indicating no scan result is transmitted to the application 2430, it influences an operation intended by the application 2430 or OS.

Accordingly, various embodiments of the present disclosure provide a method of minimizing such influence without any interface change for the WiFi scan request by the application 2430 or OS.

To this end, instead of transmitting an instruction to perform the actual scan operation to the WiFi module under a preset scan limit condition, a previously stored scan result may be transmitted to the application 2430. Accordingly, since the actual WiFi scan operation has not been performed, such a notification may correspond to a fake notification 2440.

According to various embodiments of the present disclosure, the AP 2420 may generate a signal for a WiFi search in the general mode, and transmission of the search signal may be performed every predetermined first period. However, in the sleep mode, the transmission may be performed every second period rather than the first period of the general mode. The second period may be longer than the first period, and a length thereof may be determined according to a WiFi environment. For example, when the electronic device is located in an area where WiFi cannot be used in the sleep mode, the WiFi search on the first period causes unnecessary power consumption. Accordingly, to reduce power consumption, the CP 2410 according to various embodiments of the present disclosure may control the WiFi scan period to be longer or limit the scan operation such that the scan operation is not performed in a limited scan area.

The CP 2410 may determine whether a WiFi scan limit condition is met in order to limit the WiFi scan operation. For example, the WiFi scan may be limited when the user goes beyond a Point of Interest (POI) in which the user desires to use WiFi, when the user is located in a limited area configured by the user to not use WiFi, when there is no mobility, for example, when the user moves at a predetermined speed or faster, when the user repeatedly goes beyond the POI or limited area and enters back the POI or limited area by a predetermined number of times or more, that is, when mobility is high so that WiFi cannot be used, and when the user moves on or is located in a frequently used path. To this end, the CP 2410 may determine a current position and mobility of the electronic device based on information acquired through communication with a network 2405 to limit the actual WiFi scan operation. Further, when sensor information indicating a state of the electronic device is used, a movement speed, a movement amount, and a position of the electronic device may be recognized, and thus the mobility of the electronic device may be determined based on the sensor information.

As described above, the WiFi scan operation needs to be limited according to the state or ambient condition of the electronic device, and power consumption can be reduced if the unnecessary scan operation in a state where there is no state change of the electronic device or ambient condition information is limited.

Figure 25:
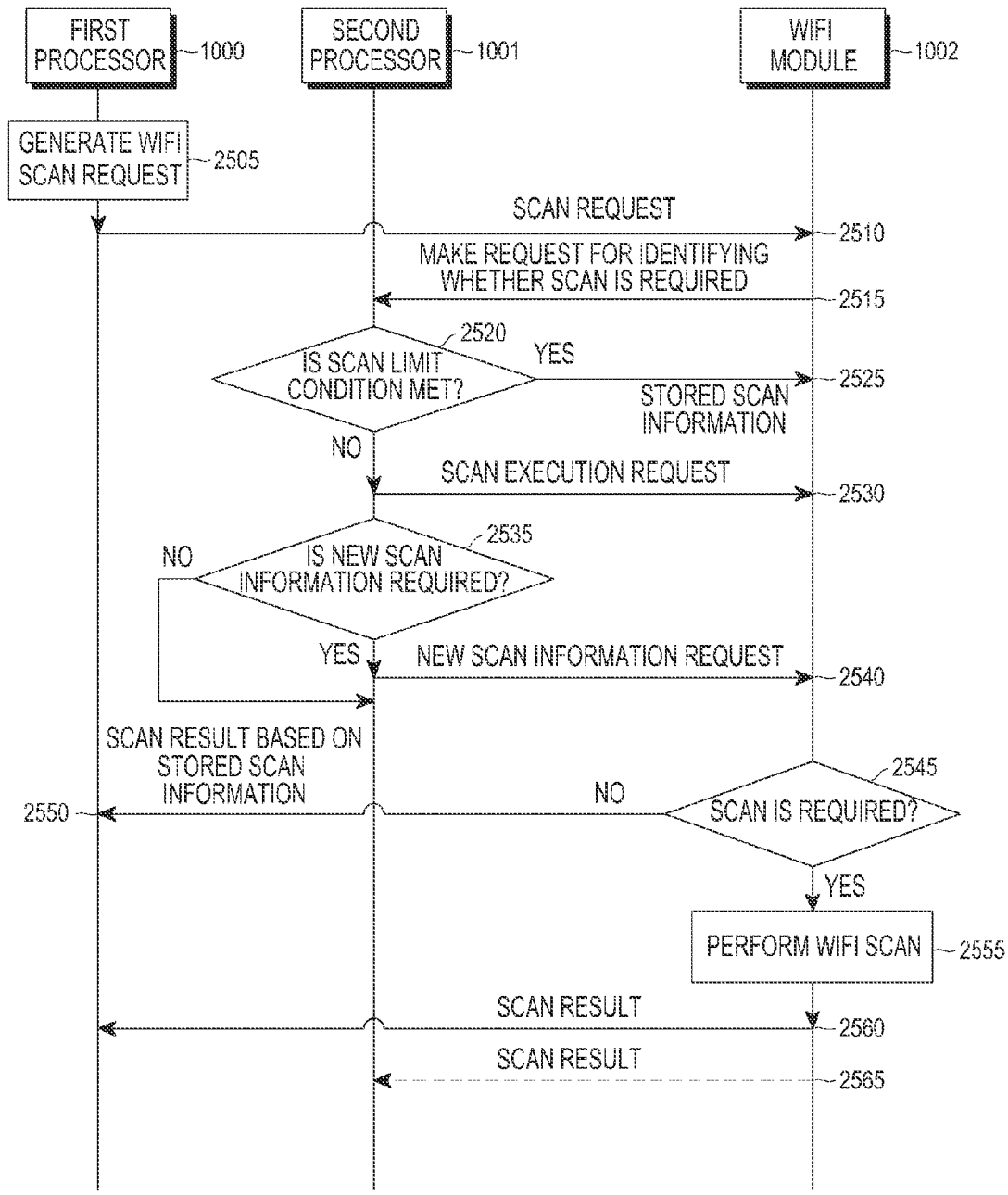
FIG. 25 illustrates a process for limiting a WiFi scan operation according to an embodiment of the present disclosure.

FIG. 25 illustrates a process for limiting a WiFi scan operation according to various embodiments of the present disclosure. FIG. 25 illustrates an example in which a first processor is an AP and a second processor is a CP.

Referring to FIG. 25, when a WiFi scan request is generated in operation 2505, the first processor 1000 may transmit the scan request to the WiFi module 1002 in operation 2510. The WiFi scan request may be generated by an application or an OS installed in the electronic device. When the request is generated, the AP corresponding to the first processor 1000 may transmit the scan request to the WiFi module 1002. For example, when an application providing a position based service using WiFi is installed in the electronic device, the corresponding application may make a request for the continuous WiFi scan to provide the service.

Such a request may be transmitted to the WiFi module 1002 by the first processor 1000 whenever the WiFi scan is needed, or the WiFi module 1002 may periodically perform the scan after the first processor transmits a scan profile having periodicity to the WiFi module 1002.

Meanwhile, in order to identify whether execution of the scan is required when the WiFi module 1002 receives the scan request from the first processor 1000, the WiFi module 1002 may transmit a request for identifying whether the scan execution is required to the second processor 1001 in operation 2515.

In response to the request, the second processor 1001 may identify whether to limit the WiFi scan based on a current state of the electronic device or an ambient environment. Based on a result of the identification, it may be determined whether a scan limit condition is met in operation 2520. When the scan limit condition is met, stored scan information may be transmitted to the WiFi module 1002 in operation 2525.

The stored scan information may be information managed by the second processor 1001 and correspond to previous scan information which has been previously scanned in a corresponding position and then stored. Since the second processor 1001 controls the WiFi module 1002 on behalf of the first processor 1000 in the sleep mode, scan information according to the WiFi scan may be also managed by the second processor 1001. However, since the first processor 1000 may control the WiFi module 1002 in a general mode in which the first processor 1000 is in the active state, the scan information according to the WiFi scan may be managed by the first processor 1000. For example, the stored scan information may include information scanned in a previous position when there is no difference between the previous position and a current position, information scanned and stored previously in accordance with a current position, most recent scan information, scan information in a current position estimated using information scanned and stored previously in the surroundings of the current position, but the type of scan information is not limited thereto. Further, the second processor 1001 may transmit the stored scan information to the WiFi module 1002 and inform the WiFi module 1002 that execution of the WiFi scan is not required at the same time in operation 2525. Accordingly, the WiFi module 1002 may recognize that the WiFi scan is not required, and thus may directly forward the stored scan information to the first processor 1000 without performing the WiFi scan.

However, when the scan limit condition is not met, the second processor 1001 may transmit a scan execution request to allow the WiFi module 1002 to perform the actual scan in operation 2530. The scan limit condition may refer to a case where a WiFi scan for a periodic signal discovery needs to be limited. For example, when the user frequently moves, adjacent access points have a little change. Accordingly, the period scan operation may be inefficient. As a result, when the WiFi scan is limited, power consumption can be reduced. Further, when the user moves at a rapid speed or is located in an area where WiFi cannot be used, the periodic scan operation may be inefficient.

According to various embodiments of the present disclosure, the WiFi scan may be limited in at least one of cases where the user is located on a frequently used path, the user goes beyond a POI in which the user desires to use WiFi, the user is located in a limited area configured by the user to not use WiFi, the user who goes beyond the POI stays in a frequently used place or path with no mobility for a predetermined time, and the user moves at a predetermined speed or faster.

In order to determine whether the limited WiFi scan condition is met, the second processor 1001 may use at least one of information (for example, a received signal strength indication and signal delay) which can measure position information of the electronic device from the network, a serving cell Identifier (ID), an adjacent cell ID, or a distance from each cell, and sensor information indicating a state of the electronic device. That is, based on at least one piece of information acquired through the network or the sensor information indicating the state of the electronic device, the mobility and position information of the electronic device may be determined.

Further, the second processor 1001 may determine whether new scan information is required in operation 2535. Specifically, the second processor 1001 may determine whether new scan information should be received from the WiFi module 1002 and make a request for updating scan information in operation 2540. The update of the scan information may be requested when newly storing and registering scan information in a current position is required, for example, when a user request or a request for registering frequently used place is made, or when stored scan information on a current position exists but the scan information needs to be updated as time passes. Although FIG. 25 illustrates that operation 2535 is performed after operation 2520, operation 2535 may be performed after a scan result is transmitted to the first processor 1000 in operation 2560. That is, sequences of operations are not limited thereto.

Meanwhile, the WiFi module 1002 may determine whether the scan is required in operation 2545 in response to the request transmitted from the second processor 1001. When it is determined that the scan is not required, for example, when the stored scan information is transmitted in operation 2525, the WiFi module 1002 may transmit a scan result based on the stored scan information from the second processor 1001 in operation 2550. At this time, the WiFi module 1002 may transmit the stored scan information from the second processor 1001 to the first processor 1000 without any change or transmit the scan information with some changes, for example, the WiFi module 1002 may transmit a scan result generated by processing stored scan information corresponding to the scan request in operation 2510.

When it is determined that the scan is required in operation 2545, the WiFi module 1002 may determine that an actual scan is required based on the scan execution request in operation 2530. Subsequently, the WiFi module 1002 may execute the WiFi scan in operation 2555 and then transmit a scan result to the first processor 1000 in operation 2560. At this time, the scan result may be transmitted to the first processor 1000 directly or via the second processor 1001. The scan result may be transmitted through an interface from the second processor 1001 to the first processor 1000. At this time, the WiFi module 1002 may transmit a scan result to the second processor 1001 in response to a new scan information request in operation 2565.

As described above, the WiFi module 1002 provides the scan result generated after the performance of the actual scan to the second processor 1001 as well as the first processor 1000, so that the second processor 1001 may mange the latest scan information. Since the description of the WiFi scan by the WiFi module 1002 and the scan result has been already known, a detailed description thereof will be omitted.

Figure 26:
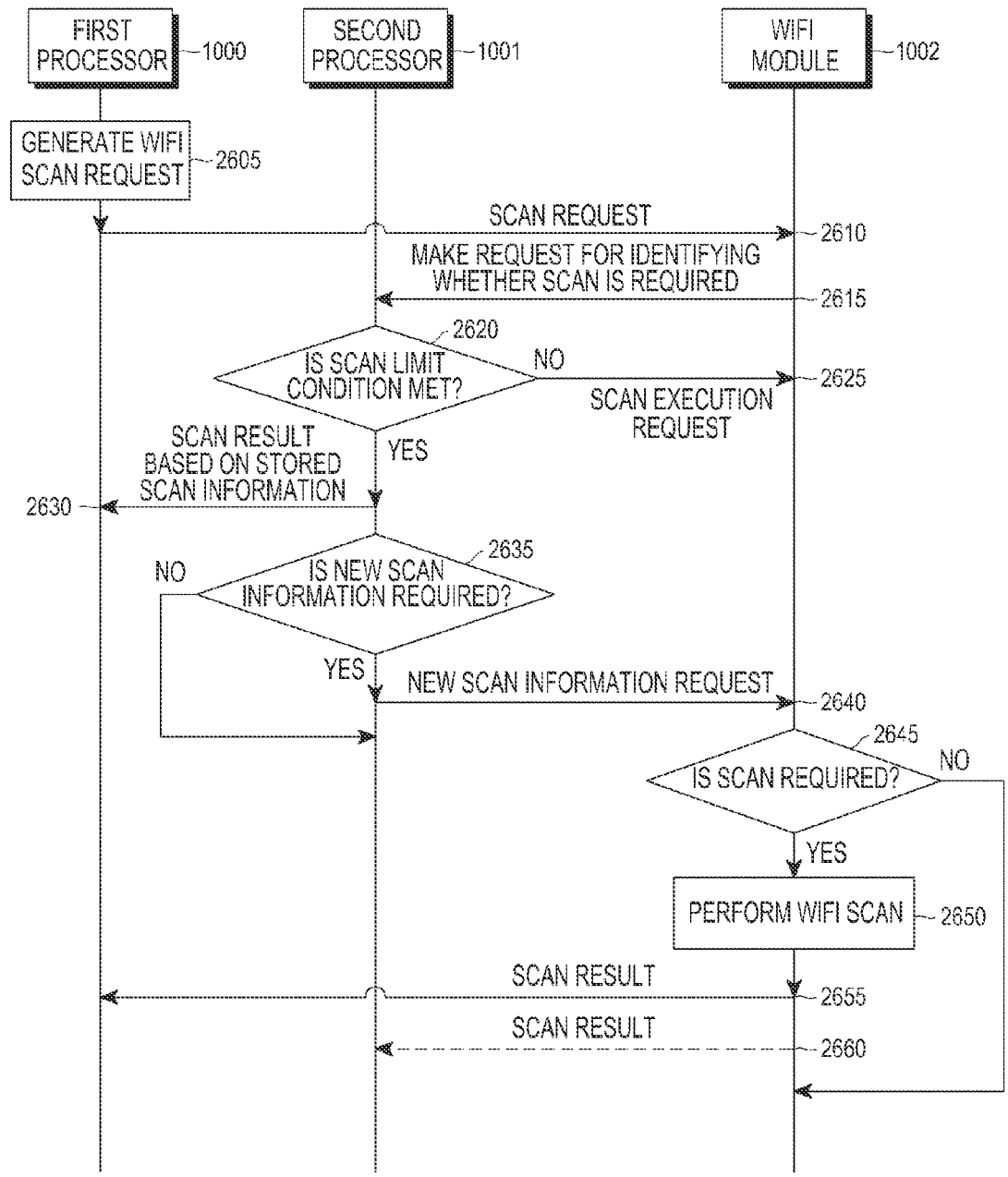
FIG. 26 illustrates a process for limiting a WiFi scan operation according to various embodiments of the present disclosure.

FIG. 26 illustrates a process for limiting a WiFi scan operation according to various embodiments of the present disclosure. FIG. 26 illustrates an example in which a first processor is an AP and a second processor is a CP.

Referring to FIG. 26, since operations 2605 to 2620 are the same as operations 2505 to 2520 of FIG. 25 and operations 2635 to 2660 are the same as operations 2535 to 2565 of FIG. 25, detailed description thereof will be omitted.

However, it is determined whether a scan limit condition is met in operation 2620 of FIG. 26. When the scan limit condition is not met, a request for executing the scan may be transmitted to the WiFi module 1002 in operation 2625. When the scan limit condition is met, that is, when there is no need to periodically perform a WiFi scan operation, a scan result based on stored scan information may be transmitted to the first processor 1000 in operation 2630. At this time, the second processor 1001 may inform the WiFi module 1002 that the scan is not required or may omit such a notification operation.

As described above, FIG. 26 illustrates a case where the stored scan information managed by the second processor 1001 is transmitted through the interface from the second processor 1001 to the first processor 1000 without passing through the interface to the first processor 1000 through the WiFi module 1002.

Figure 27:
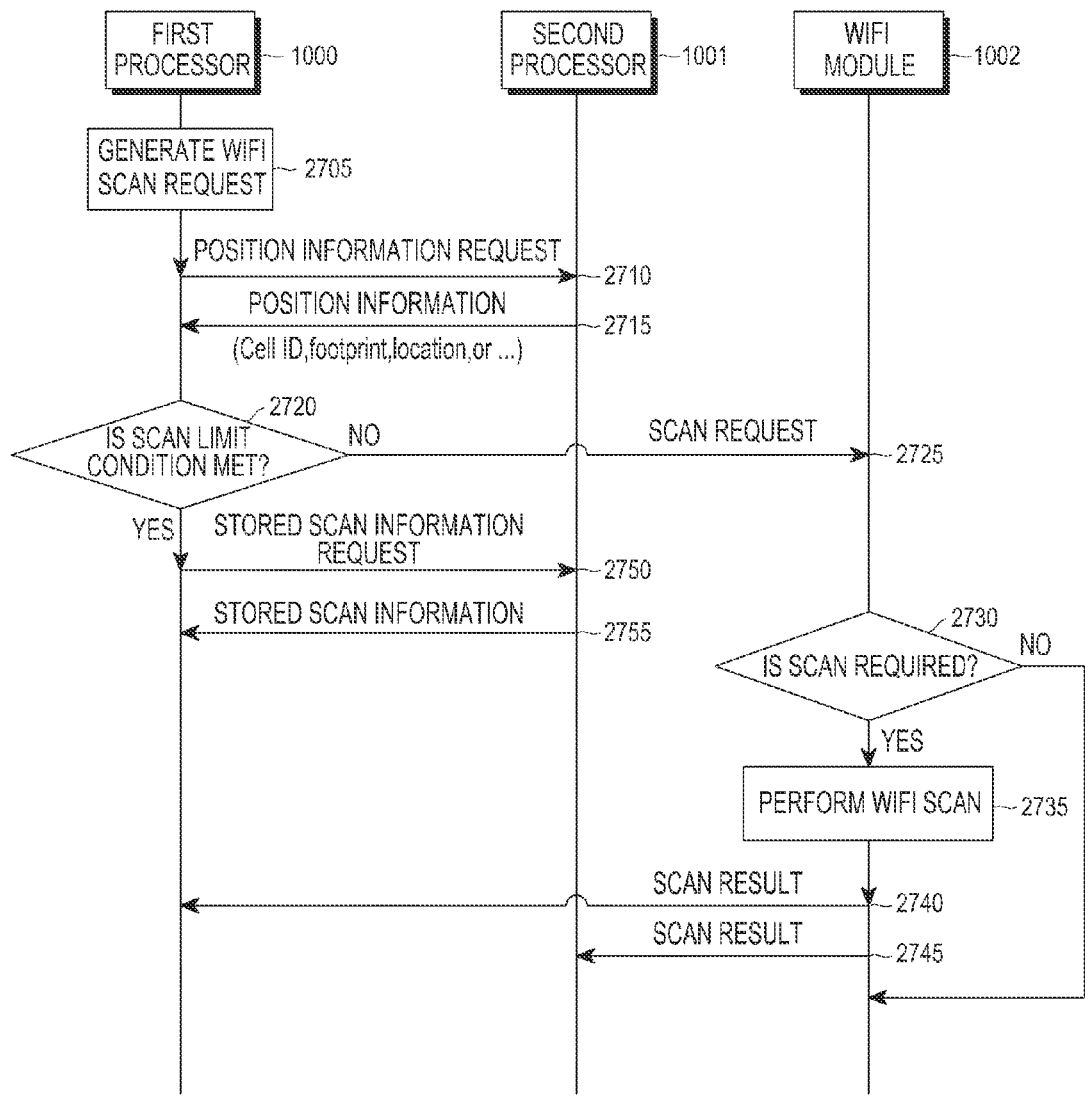
FIG. 27 illustrates a process for limiting a WiFi scan operation according to an embodiment of the present disclosure.

FIG. 27 illustrates a process for limiting a WiFi scan operation according to an embodiment of the present disclosure. FIG. 27 illustrates an example in which a first processor is an AP and a second processor is a CP. In an active state of the first processor 1000, the WiFi scan operation through the WiFi module 1002 may be performed under a control of the first processor 1000.

Referring to FIG. 27, when a WiFi scan request by an application or OS installed in the electronic device is generated in operation 2705, the first processor 1000 may make a request for position information to the second processor 1001 in operation 2710 and acquire the position information corresponding to the request in operation 2715. Since the second processor 1001 is the CP which exchanges data through the network, the first processor 1000 makes a request for the position information to the second processor 1001. Accordingly, the first processor 1000 may acquire the position information such as a cell ID, a footprint, and a location.

In operation 2720, the first processor 1000 may determine whether a scan limit condition is met to determine whether the scan should be limited based on the position information. When the scan limit condition is not met, that is, when the scan is required, the first processor 1000 may make a request for the scan to the WiFi module 1002 in operation 2725. The WiFi module 1002 may determine that the scan is required in operation 2730 in response to the scan request, execute the WiFi scan in operation 2735, and then transmit a scan result to the first processor 1000 in operation 2740. At this time, the WiFi module 1002 may transmit the scan result to the second processor 1001 in operation 2745 so that the second processor 1001 may mange the scan information. The position information or the scan result may be managed by the first processor 1000 according to the implementation.

When the scan limit condition is met in operation 2720, that is, when the scan needs to be limited, the first processor 1000 may make a request for stored scan information to the second processor 1001 in operation 2750 instead of making a request for the scan to the WiFi module 1002, and acquire the stored scan information managed by the second processor 1001 in operation 2755. The stored scan information may be managed by the first processor 1000 according to the implementation. The limit of the scan may be determined based on the mobility or current position of the electronic device on the basis of the position information, and the scan may be needed to be limited when the user goes beyond a POI registered by the user who desires to use WiFi, when the user is a limited area configured by the user not to use WiFi, when there is no mobility, when the user moves at a predetermined speed or faster, or when the user is located on a frequently used path.

Accordingly, the first processor 1000 may transmit the scan result based on the stored scan information or an actual scan result to a target which makes a request for the WiFi scan, and accordingly, the scan result may be provided to the application or OS which makes the request for the WiFi scan. As described above, according to various embodiments of the present disclosure, whenever the application or OS makes a scan request, a scan result corresponding to the scan request may be provided every time. Further, the application or OS determines that the scan result is generated by the performance of an actual scan, so that an operation of the application or OS is not influenced thereby.

Although the WiFi communication has been described as one embodiment of the short range communication to easily discuss the present disclosure, the WiFi communication module may be replaced with another communication module in various embodiments of the present disclosure. For example, various communication modules such as a BT module, a Zigbee module, an NFC module, and a GPS module may be controlled by at least one of the first processor and the second processor. For example, when the first processor is in an inactive state (for example, a sleep state) in an interval where the second processor (for example, the CP) is periodically activated (for example, a DRX interval or a paging signal reception interval), various communication modules such as a BT module, a Zigbee module, an NFC module, and a GPS module may be controlled through the second processor.

The "module" used in various embodiments of the present disclosure may refer to, for example, a "unit" including one of hardware, software, and firmware, or a combination of two or more of the hardware, software, and firmware. The "module" may be interchangeably used with a term, such as unit, logic, logical block, component, or circuit. The "module" may be the smallest unit of an integrated component or a part thereof. The "module" may be the smallest unit that performs one or more functions or a part thereof. The "module" may be mechanically or electronically implemented. For example, the "module" according to various embodiments of the present disclosure may include at least one of an Application-Specific IC (ASIC) chip, a Field-Programmable Gate Arrays (FPGAs), and a programmable-logic device for performing operations which have been known or are to be developed hereafter.

According to various embodiments of the present disclosure, at least part of a device (for example, modules or functions thereof) or a method (for example, operations) according to the various embodiments of the present disclosure may be embodied by, for example, an instruction stored in a non-transitory machine-readable storage medium provided in a form of a programming module. When the command is executed by one or more processors (for example, the processor 325), the one or more processors may execute a function corresponding to the command. The non-transitory machine-readable storage medium may be, for example, the memory 330. At least some of the programming modules may be implemented (for example, executed) by, for example, the processor 325. At least some of the programming modules may include, for example, a module, a program, a routine, a set of instructions, or a process for performing one or more functions.

The non-transitory machine-readable recording medium may include magnetic media such as a hard disk, a floppy disk, and a magnetic tape, optical media such as a Compact Disc ROM (CD-ROM) and a DVD, magneto-optical media such as a floptical disk, and hardware devices specially configured to store and perform a program instruction (for example, programming module), such as a ROM, a RAM, a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

A module or a programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, a storage medium stores commands. When the commands are executed by one or more processors, the one or more processors are configured to perform one or more operations. The one or more operations may include an operation in which a second processor receives a specified signal informing that a first processor enters an inactive state from an active state from the first processor; and an operation in which the second processor controls a WiFi communication function in response to the specified signal.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a wireless fidelity (WiFi) interface configured to perform WiFi communication;
   a first processor configured to control the WiFi interface; and
   a second processor configured to:
      receive a specified signal informing that the first processor enters an inactive state from an active state from the first processor, and
      control the WiFi interface in response to the specified signal.

2. The electronic device of claim 1, wherein the first processor and the second processor correspond to an application processor and a communication processor, respectively.

3. The electronic device of claim 1,
   wherein, when the first processor enters the inactive state from the active state, the first processor is further configured to transmit a specified signal informing the second processor of the entrance to the active state, and
   wherein the second processor is further configured to release a control of the WiFi interface in response to the signal informing of the entrance to the active state.

4. The electronic device of claim 1,
   wherein the second processor is further configured to control the WiFi interface according to a communication period set to the second processor, and
   wherein the set communication period includes a discontinuous reception (DRX) period defined in a long term evolution (LTE) standard.

5. The electronic device of claim 1,
   wherein, when the first processor enters the inactive state, the first processor is further configured to transmit information on one or more access points related to the WiFi interface to the second processor, and
   wherein the second processor is further configured to perform a scan or connection through the WiFi interface based on the information.

6. The electronic device of claim 1, wherein the inactive state includes one of a sleep state of the electronic device, a sleep state of the first processor, or a power off state of the first processor.

7. The electronic device of claim 1,
   wherein the first processor is further configured to enter an inactive state when a voice over long term evolution (VoLTE) call is connected through the second processor, and
   wherein the second processor is further configured to:
      perform a scan through the WiFi interface in response to the specified signal, and
      hand over the VoLTE call to a WiFi call based on a result of the scan when quality of a WiFi connection state through the WiFi interface meets a specified quality condition.

8. The electronic device of claim 1, wherein the WiFi interface is further configured to perform WiFi authentication and association based on universal subscriber Identity module (USIM) information from the second processor.

9. The electronic device of claim 1, wherein, when a request for determining whether a WiFi scan is required is received from the WiFi interface, the second processor is further configured to:
   determine whether a scan limit condition is met, and
   provide stored scan information when it is determined the scan limit condition is met.

10. The electronic device of claim 9, wherein the scan limit condition includes at least one of a case where a user goes beyond a point of interest (POI) registered by the user who desires to use WiFi, a case where a user is located in a limited area configured by the user to not use WiFi, a case where there is no mobility, when a user moves at a predetermined speed or faster, or a case where a user is located on a frequently used path.

11. The electronic device of claim 1, wherein, when a WiFi scan request is generated, the first processor is further configured to:
   determine whether the scan needs to be limited based on position information of the electronic device, and
   output a scan result based on stored scan information when it is determined the scan needs to be limited.

12. A method of controlling a communication interface by an electronic device, the method comprising:
   receiving, by a second processor, a specified signal from a first processor informing that the first processor enters an inactive state from an active state; and
   controlling, by the second processor, a wireless fidelity (WiFi) communication function in response to the specified signal.

13. The method of claim 12, further comprising:
   receiving a signal from the first processor informing that the first processor enters the active state from the inactive state; and
   releasing the control of the WiFi communication function in response to the signal informing that the entrance to the active state.

14. The method of claim 12, further comprising controlling, by the first processor, the WiFi communication function according to a communication period set by the second processor,
   wherein the set communication period includes a discontinuous reception (DRX) period defined in a long term evolution (LTE) standard.

15. The method of claim 12, further comprising receiving information on one or more access points from the first processor related to the WiFi function after receiving the specified signal.

16. The method of claim 15, further comprising controlling, by the second processor, to perform a scan or connection through a WiFi interface based on the information.

17. The method of claim 12, further comprising performing, by a WiFi interface, WiFi authentication and association based on universal subscriber identity module (USIM) information from the second processor.

18. The method of claim 12, wherein the inactive state includes one of a sleep state of the electronic device, a sleep state of the first processor, or a power off state of the first processor.

19. The method of claim 12, further comprising:
   when a voice over long term evolution (VoLTE) call is connected, controlling, by the second processor, to perform a scan through a WiFi interface in response to the specified signal; and
   controlling to hand over the VoLTE call to a WiFi call based on a result of the scan when quality of a WiFi connection state meets a specified quality condition.

20. The method of claim 12, further comprising:
   when a request for determining whether a WiFi scan execution is required is received from the WiFi interface, determining whether a scan limit condition is met; and
   when it is determined the scan limit condition is met, providing stored scan information.

21. The method of claim 20, wherein the scan limit condition includes at least one of a case where a user goes beyond a point of interest (POI) registered by the user who desires to use WiFi, a case where a user is located in a limited area configured by the user to not use WiFi, a case where there is no mobility, when a user moves at a predetermined speed or faster, or a case where a user is located on a frequently used path.

22. The method of claim 12, further comprising:
   when a WiFi scan request is generated, determining whether the scan needs to be limited based on position information of the electronic device; and
   outputting a scan result based on stored scan information when it is determined the scan is needed to be limited.

23. A non-transitory computer-readable storage medium storing instructions that, when executed, cause at least one processor to perform a method of controlling a communication interface by an electronic device, the method comprising:
   receiving, by a second processor, a specified signal from a first processor informing that the first processor enters an inactive state from an active state; and
   controlling, by the second processor, a wireless fidelity (WiFi) communication function in response to the specified signal.

* * * * *